US012634419B2

(12) United States Patent
Goto

(10) Patent No.: US 12,634,419 B2
(45) Date of Patent: May 19, 2026

(54) METHOD OF CORRECTING PROJECTION IMAGE, PROJECTION SYSTEM, AND NON-TRANSITORY COMPUTER-READABLE STORAGE MEDIUM STORING PROGRAM

(71) Applicant: SEIKO EPSON CORPORATION, Tokyo (JP)

(72) Inventor: Kiichiro Goto, Oita (JP)

(73) Assignee: SEIKO EPSON CORPORATION, Tokyo (JP)

( * ) Notice: Subject to any disclaimer, the term of this patent is extended or adjusted under 35 U.S.C. 154(b) by 396 days.

(21) Appl. No.: 18/331,264

(22) Filed: Jun. 8, 2023

(65) Prior Publication Data

US 2023/0403380 A1     Dec. 14, 2023

(51) Int. Cl.
   *G03B 21/14*       (2006.01)
   *G06F 3/01*        (2006.01)
   *H04N 9/31*       (2006.01)

(52) U.S. Cl.
   CPC ........... *H04N 9/3185* (2013.01); *G06F 3/017* (2013.01)

(58) Field of Classification Search
   CPC .... G03B 21/147; G03B 21/14; H04N 9/3185; H04N 9/3194
   See application file for complete search history.

(56) References Cited

U.S. PATENT DOCUMENTS

2022/0197498 A1*   6/2022   Awazu ................... G06F 3/017

FOREIGN PATENT DOCUMENTS

| | | |
|---|---|---|
| JP | 2000-250681 A | 9/2000 |
| JP | 2008-146374 A | 6/2008 |
| JP | 2012-129594 A | 7/2012 |
| JP | 2014-127942 A | 7/2014 |
| JP | 2016-012203 A | 1/2016 |
| JP | 2016-186656 A | 10/2016 |
| JP | 2020-107149 A | 7/2020 |
| JP | 2020-113102 A | 7/2020 |
| JP | 2021-176548 A | 11/2021 |

OTHER PUBLICATIONS

Panasonic Connect Co., Ltd,.Software Applications, 6 pgs.
Epson, Business Projector Epson EB-L30000U/L30002U, 7 pgs.
Panasonic Corporation, Geometry Manager Pro Manual; Date: May 2021, 23 pgs.

* cited by examiner

*Primary Examiner* — Ryan D Howard
(74) *Attorney, Agent, or Firm* — Dority & Manning, P.A.

(57)        ABSTRACT

A method of correcting a projection image includes projecting, by a projector, a first image including a plurality of control points configured to correct the projection image on a projection surface, identifying at least one first control point from the plurality of control points based on a position of at least one of hands of a user in the first image when a first gesture operation by at least one of the hands of the user is detected, and projecting, by the projector, a second image obtained by moving a position of the at least one first control point from a first position to a second position based on a position of at least one of the hands of the user in the first image on the projection surface when a second gesture operation by at least one of the hands of the user is detected.

15 Claims, 12 Drawing Sheets

Figure 12:
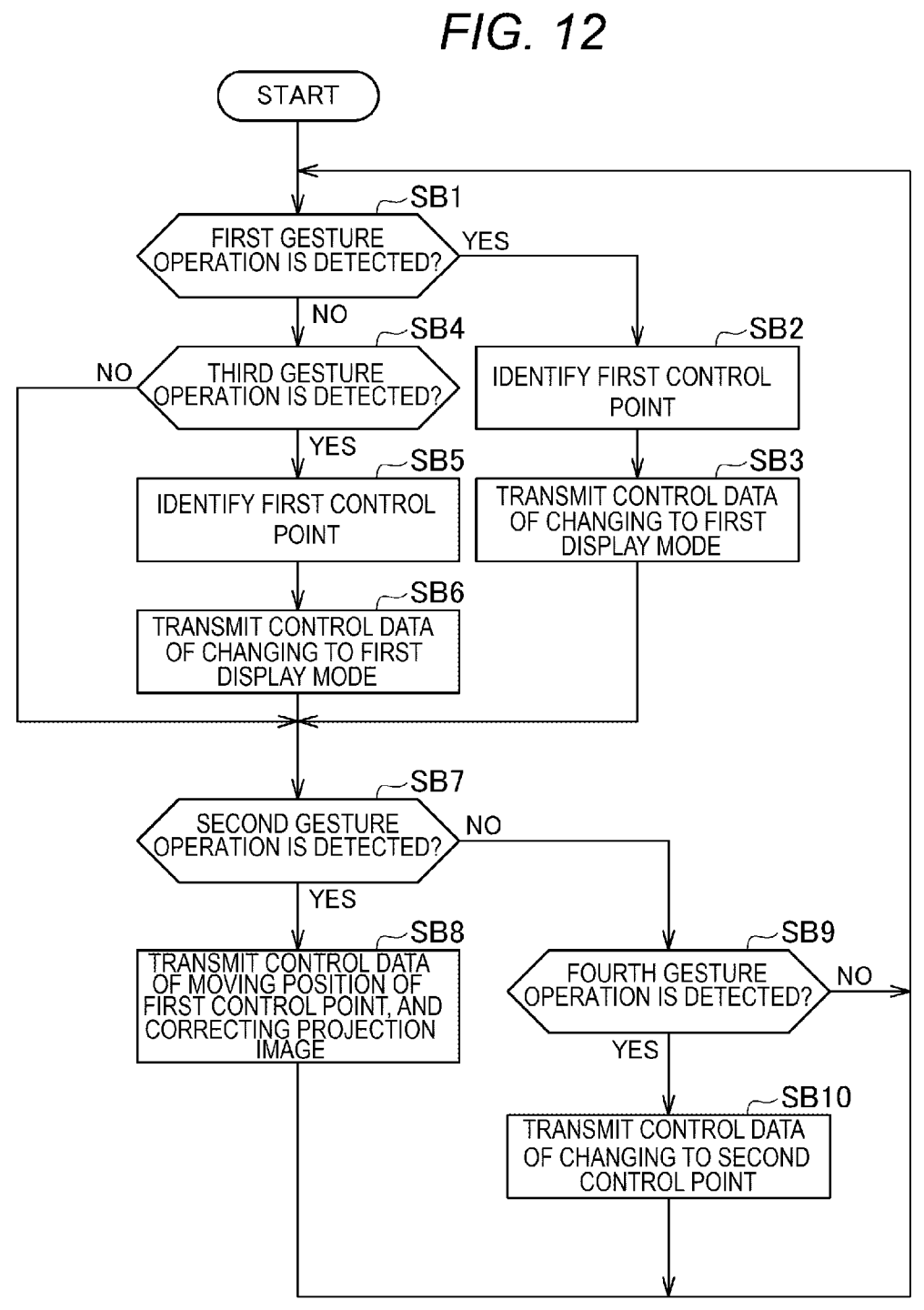

START

SB1
FIRST GESTURE OPERATION IS DETECTED? — YES

NO

SB4
THIRD GESTURE OPERATION IS DETECTED? — NO

SB2
IDENTIFY FIRST CONTROL POINT

YES

SB5
IDENTIFY FIRST CONTROL POINT

SB3
TRANSMIT CONTROL DATA OF CHANGING TO FIRST DISPLAY MODE

SB6
TRANSMIT CONTROL DATA OF CHANGING TO FIRST DISPLAY MODE

SB7
SECOND GESTURE OPERATION IS DETECTED? — NO

YES

SB8
TRANSMIT CONTROL DATA OF MOVING POSITION OF FIRST CONTROL POINT, AND CORRECTING PROJECTION IMAGE

SB9
FOURTH GESTURE OPERATION IS DETECTED? — NO

YES

SB10
TRANSMIT CONTROL DATA OF CHANGING TO SECOND CONTROL POINT

1

METHOD OF CORRECTING PROJECTION IMAGE, PROJECTION SYSTEM, AND NON-TRANSITORY COMPUTER-READABLE STORAGE MEDIUM STORING PROGRAM

The present application is based on, and claims priority from JP Application Serial Number 2022-092785, filed Jun. 8, 2022, the disclosure of which is hereby incorporated by reference herein in its entirety.

BACKGROUND

1. Technical Field

The present disclosure relates to a method of correcting a projection image, a projector, a projection system, and a non-transitory computer-readable storage medium storing a program.

2. Related Art

In the past, there has been known a technology of correcting a projection image. For example, JP-A-2012-129594 (Document 1) discloses a method of correcting positions of four corners of a projection image by moving adjustment markers in accordance with a movement of a hand.

However, in the method disclosed by Document 1, a selection operation of the adjustment marker to be moved is not considered. Therefore, in the method disclosed by Document 1, there can occur an erroneous operation that the adjustment marker which the user does not intend to move moves to a position which the user does not intend in accordance with a motion of a hand of the user.

SUMMARY

A method of correcting a projection image according to the present disclosure includes projecting, by a projector, a first image including a plurality of control points configured to correct the projection image on a projection surface, identifying at least one first control point from the plurality of control points based on a position of at least one of hands of a user in the first image when a first gesture operation by at least one of the hands of the user is detected based on an output value of a sensor, and projecting, by the projector, a second image obtained by moving a position of the at least one first control point from a first position to a second position based on a position of at least one of the hands of the user in the first image on the projection surface when a second gesture operation by at least one of the hands of the user different from the first gesture operation is detected based on an output value of the sensor.

A projector according to the present disclosure includes at least one processor configured to execute projecting a first image including a plurality of control points configured to correct a projection image on a projection surface, identifying at least one first control point from the plurality of control points based on a position of at least one of hands of a user in the first image when a first gesture operation by at least one of the hands of the user is detected based on an output value of a sensor, and projecting a second image obtained by moving a position of the at least one first control point from a first position to a second position based on a position of at least one of the hands of the user in the first image on the projection surface when a second gesture operation by at least one of the hands of the user different from the first gesture operation is detected based on an output value of the sensor.

A projection system according to the present disclosure includes a sensor, a control device configured to execute identifying at least one first control point from a plurality of control points configured to correct the projection image based on a position of at least one of hands of a user in a first image which is projected on a projection surface, and which includes the plurality of control points, when a first gesture operation by at least one of the hands of the user is detected based on an output value of a sensor, and detecting a second gesture operation by at least one of the hands of the user different from the first gesture operation based on an output value of the sensor, and a projector configured to execute projecting the first image on the projection surface, and projecting a second image obtained by moving a position of the at least one first control point from a first position to a second position based on a position of at least one of the hands of the user in the first image on the projection surface when the second gesture operation is detected by the control device.

In a non-transitory computer-readable storage medium storing a program according to the present disclosure, the program is configured to make at least one processor execute processing including projecting a first image including a plurality of control points configured to correct a projection image from a projector on a projection surface, identifying at least one first control point from the plurality of control points based on a position of at least one of hands of a user in the first image when a first gesture operation by at least one of the hands of the user is detected based on an output value of a sensor, and projecting a second image obtained by moving a position of the at least one first control point from a first position to a second position based on a position of at least one of the hands of the user in the first image from the projector on the projection surface when a second gesture operation by at least one of the hands of the user different from the first gesture operation is detected based on an output value of the sensor.

BRIEF DESCRIPTION OF THE DRAWINGS

FIG. 6 is a diagram showing an example of the point correction UI.

FIG. 12 is a flowchart showing an operation of a control device.

DESCRIPTION OF EXEMPLARY EMBODIMENTS

First Embodiment

First, a first embodiment will be described.

Figure 1:
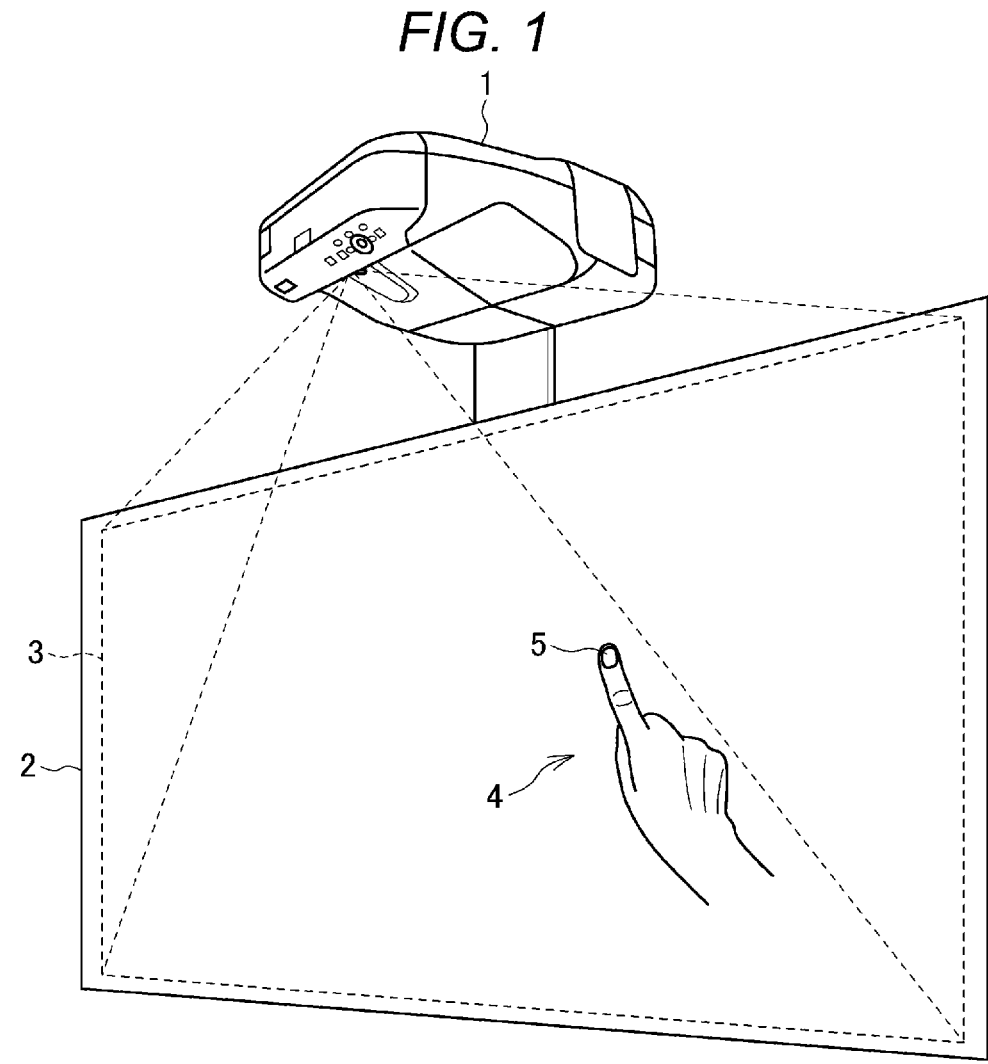
FIG. 1 is a perspective view showing an installation aspect of a projector.
Figure 1:
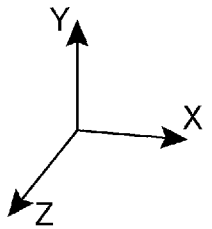
Figure 2:
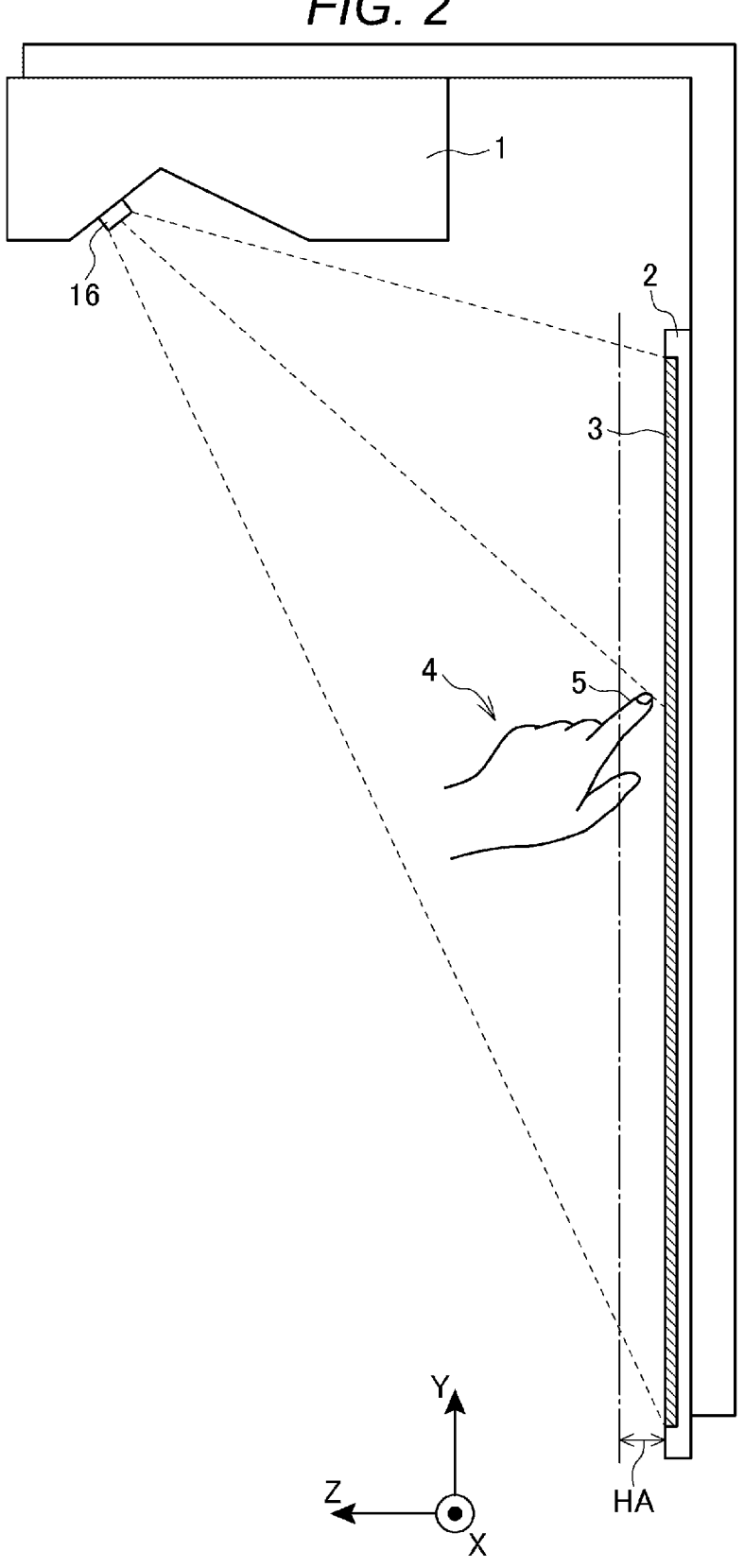
FIG. 2 is a side view showing the installation aspect of the projector.

FIG. 1 is a perspective view showing an installation aspect of a projector 1. FIG. 2 is a side view showing an installation aspect of the projector 1.

The projector 1 generates image light corresponding to image data, and then emits the image light thus generated on a projection surface 2.

The description will hereinafter be presented defining a normal line of the projection surface 2 as a Z axis, a vertical axis as a Y axis, and an axis perpendicular to the Z axis and the Y axis as an X axis. The Z axis corresponds to a front-back direction in an installation state of the projector 1. A positive direction of the Z axis represents a forward direction. The Y axis corresponds to an up-down direction. A positive direction of the Y axis represents an upward direction. The X axis corresponds to a right-left direction. A positive direction of the X axis represents a rightward direction.

The projector 1 is installed in front of and above the projection surface 2, and emits the image light toward the projection surface 2. A region of the projection surface 2 to which the image light is emitted is hereinafter referred to as a projection region 3. On the projection region 3, there is projected the projection image by the image light emitted by the projector 1.

It should be noted that the projection surface 2 can be a screen, or can also be a wall surface of a building, or a plane of an installation. Further, the projection surface 2 is not limited to a plane, but can also be a curved surface or a surface having asperity.

The projector 1 is provided with an interactive function. The interactive function means a function of detecting a position of the projection surface 2 designated with a pointer, and then project an image corresponding to a position or a trajectory of the pointer on the projection surface 2 based on the position thus detected, or adding a change to the image thus projected.

In the present embodiment, a finger 5 of a hand 4 is illustrated as the pointer.

The projector 1 emits detection light LT in a direction corresponding to the projection surface 2. Therefore, when a tip of the finger 5 makes contact with the projection surface 2, the finger 5 blocks the detection light LT. The detection light LT collides with the finger 5 to be reflected, and a part of the reflected light of the detection light LT proceeds toward the projector 1 from the finger 5. The projector 1 detects the reflected light which is the detection light LT reflected by the finger 5 to thereby detect a position pointed by the finger 5. The projector 1 emits the detection light LT in the direction corresponding to the projection surface 2. Specifically, the direction corresponding to the projection surface 2 is a direction in which the reflected light reflected by the finger 5 in a range HA can enter an infrared camera 17. The range HA means a range in the front-back direction, and a range in which a distance in the forward direction from the projection surface 2 is equal to or shorter than a threshold value. The detection light LT is emitted in a range including at least a part of the projection surface 2. In the present embodiment, the detection light LT is emitted in a range which covers at least an entire area of the projection region 3. It should be noted that the detection light LT is the light used for detecting the pointer, and infrared light is used as the detection light LT in the preset embodiment.

The infrared camera 17 is an example of a sensor in the present disclosure.

Figure 3:
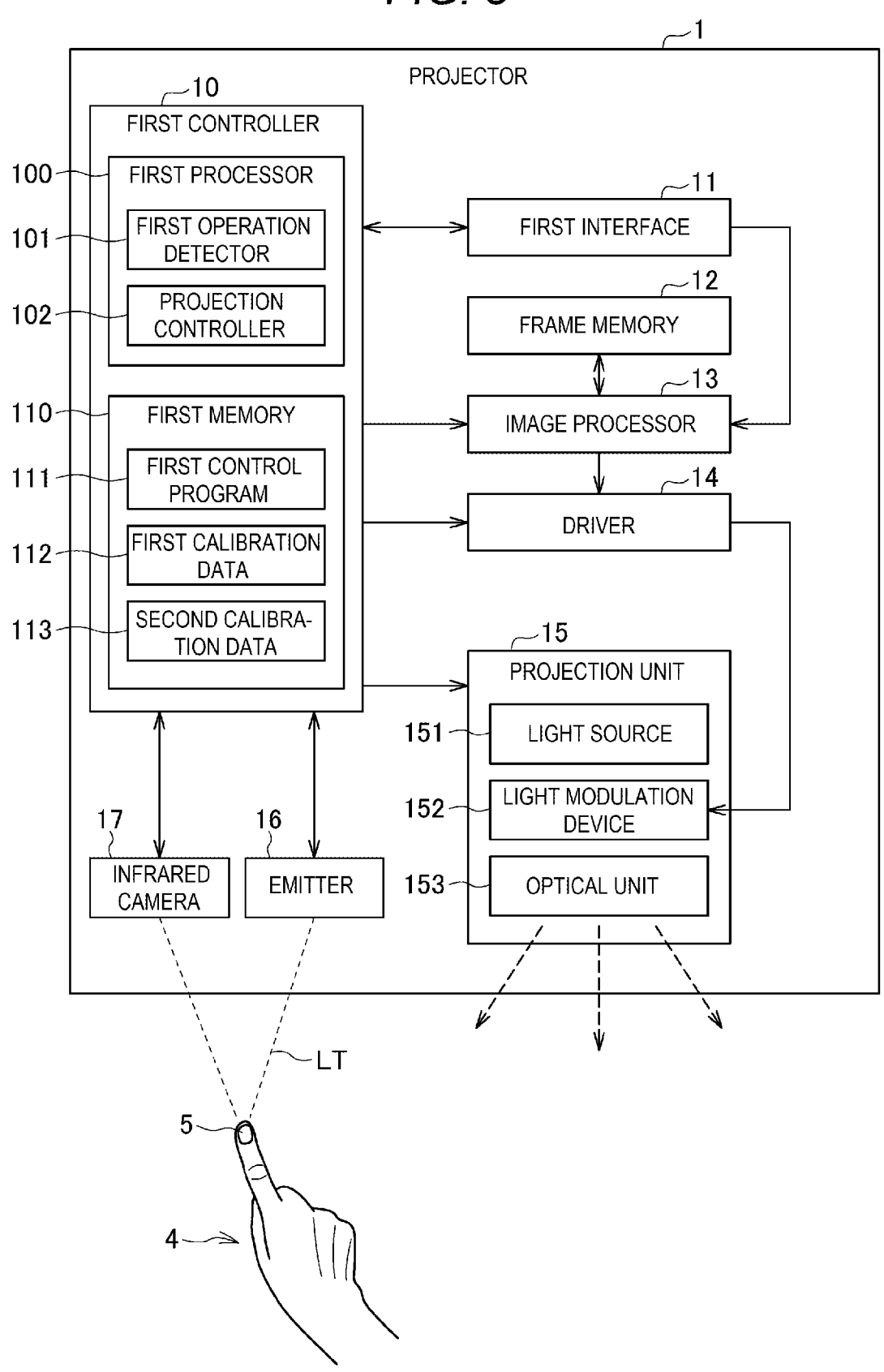
FIG. 3 is a diagram showing a configuration of the projector.

FIG. 3 is a diagram showing a configuration of the projector 1.

The projector 1 is provided with a first controller 10.

The first controller 10 is provided with a first processor 100 for executing a program such as a CPU (Central Processing Unit) or an MPU (Micro-Processing Unit) and a first memory 110, and controls each part of the projector 1. Functional units of the first processor 100 will be described later.

The first controller 10 is an example of a controller in the present disclosure. The first processor 100 is an example of at least one processor in the present disclosure.

The first memory 110 stores a program to be executed by the first processor 100, and data to be processed by the first processor 100. The first memory 110 stores a first control program 111 to be executed by the first processor 100, first calibration data 112, second calibration data 113, and other various types of data. The first memory 110 has a nonvolatile storage area. The first memory 110 can be provided with a volatile storage area to constitute a work area for the first processor 100. The first memory 110 is formed of, for example, a ROM (Read Only Memory) and a RAM (Random Access Memory).

The first control program 111 is an example of a program in the present disclosure.

The first calibration data 112 is data of associating a taken image by the infrared camera 17 and the projection region 3 with each other. More specifically, the first calibration data 112 is data for making coordinates of pixels in a coordinate system of the taken image by the infrared camera 17 and coordinates of pixels in a coordinate system of a frame memory 12 correspond to each other.

The second calibration data 113 is data of associating the projection region 3 and each of control points 203 of a point correction UI 200 described later with each other. More specifically, the second calibration data 113 is data for making the coordinates of the pixels in the coordinate system of the frame memory 12 and coordinates of pixels corresponding to the control points 203 of the point correction UI 200 developed in the frame memory 12 correspond to each other.

The projector 1 is provided with a first interface 11.

The first interface 11 is provided with a connector, an interface circuit, and so on compliant with a predetermined communication standard. The first interface 11 transmits/receives the image data, control data, and so on to/from an external device in accordance with control by the first controller 10, and in compliance with the predetermined communication standard. It should be noted that the image data to be transmitted/received by the first interface 11 can be still image data, or moving image data, and can also be accompanied by audio data.

The projector 1 is provided with the frame memory 12, and an image processor 13.

The frame memory 12 and the image processor 13 are formed of, for example, an integrated circuit. The integrated circuit includes an LSI, an ASIC (Application Specific Integrated Circuit), a PLD (Programmable Logic Device), an FPGA (Field-Programmable Gate Array), an SoC (System-on-a-Chip), and so on. Further, an analog circuit can be included as a part of a configuration of the integrated circuit, or it is also possible to adopt a configuration in which the first controller 10 and the integrated circuit are combined with each other.

The frame memory 12 is provided with a plurality of banks. Each of the banks has a storage capacity sufficient for writing one frame. The frame memory 12 is formed of, for example, an SDRAM (Synchronous Dynamic Random Access Memory).

The image processor 13 performs image processing such as resolution conversion processing, resizing processing, a correction of a distortion aberration, geometric correction processing, digital zoom processing, and image processing such as an adjustment of the tint and luminance of the image on the image data developed in the frame memory 12. The image processor 13 executes the processing designated by the first controller 10, and performs the processing using a parameter input from the first controller 10 as needed. Further, it is possible for the image processor 13 to execute two or more of the image processing described above in combination with each other.

Due to the control by the first controller 10, the image processor 13 performs processing of superimposing a user interface related to the projector 1 on an image represented by image data developed in the frame memory 12. The image processor 13 superimposes the user interface for performing a point correction on the image represented by the image data developed in the frame memory 12. The point correction means a correction of the projection image performed by a position adjustment of the control points 203 arranged in a grid-like pattern. The user interface for performing the point correction is hereinafter described as the point correction UI 200. In the point correction, a parameter of a geometric correction is calculated based on a result of the point correction, and the image processor 13 processes the image developed in the frame memory 12 using that parameter.

When the superimposition of the point correction UI 200 is instructed by the first controller 10, the image processor 13 superimposes the point correction UI 200 on the image represented by the image data developed in the frame memory 12. Specifically, the image processor 13 combines image data of the point correction UI 200 with the image data developed in the frame memory 12. The image data thus combined is output to a driver 14. It should be noted that when the instruction of superimposing the point correction UI 200 is not issued by the first controller 10, the image processor 13 outputs the image data developed in the frame memory 12 to the driver 14 without combining the image data of the point correction UI 200.

Figure 4:
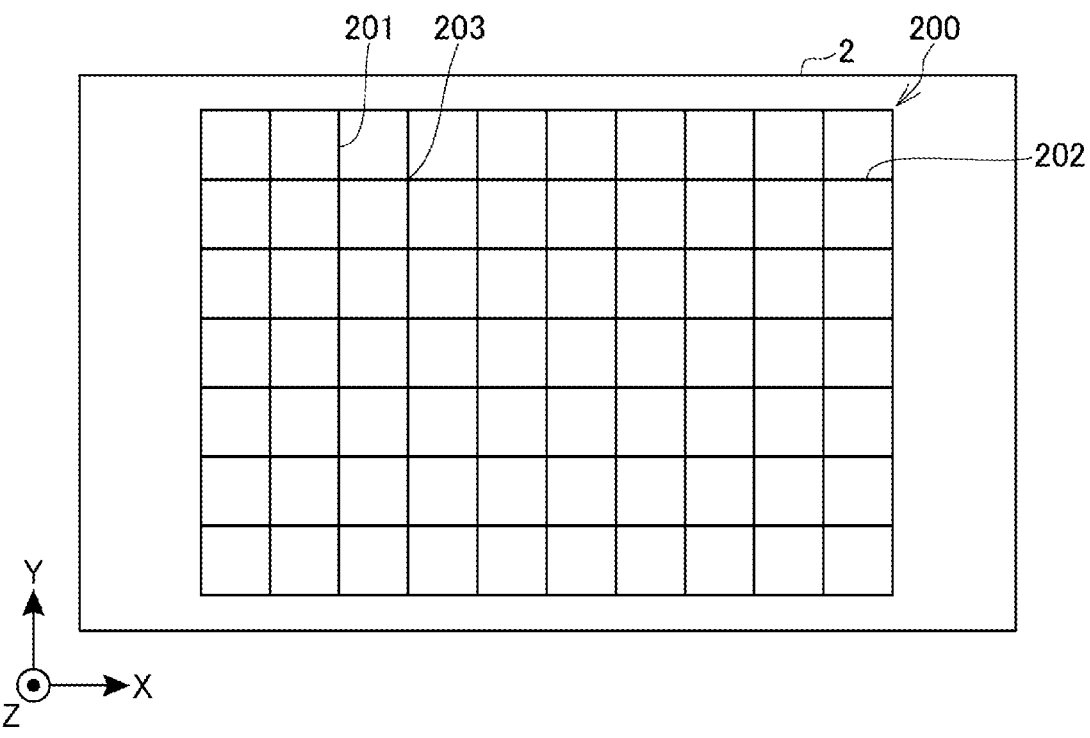
FIG. 4 is a diagram showing an example of a point correction UI.

FIG. 4 is a diagram showing an example of the point correction UI 200.

The point correction UI 200 includes a plurality of vertical lines 201 and a plurality of horizontal lines 202. The vertical lines 201 are arranged at regular intervals in the right-left direction. The horizontal lines 202 are arranged at regular intervals in the up-down direction. Intersections between the vertical lines 203 and the horizontal lines 202 are each the control point 203. The control points 203 are points to be controlled by the user in order to perform the correction of the projection image. The position of each of the control points 203 is adjusted by the user.

In the following description, when indicating the control point 203 at an N-th row and an M-th column, a description of 203-N-M is used. The characters N and M each represent an integer equal to or greater than 1. The character N is defined as an integer representing a row number incremented along a rightward direction. The character M is defined as an integer representing a column number incremented along a downward direction. For example, in the point correction UI 200 shown in FIG. 4, the control point 203 corresponding to an upper left corner is described as the control point 203-1-1. Further, for example, in the point correction UI 200 shown in FIG. 4, the control point 203 corresponding to a lower right corner is described as the control point 203-11-8.

Although there is illustrated when the point correction UI 200 includes the 11 vertical lines 201 and the 8 horizontal lines 202 in the present embodiment, the number of the vertical lines 201 and the number of the horizontal lines 202 included in the point correction UI 200 are only required to be plural, and are not limited to the numbers illustrated in the present embodiment.

The projector 1 is provided with the driver 14 and a projection unit 15.

The driver 14 includes a light source drive circuit for putting a light source 151 on or off, and a light modulation device drive circuit. The light modulation device drive circuit drives a light modulation device 152 in accordance with the control by the first controller 10 to draw an image frame by frame on light modulation elements provided to the light modulation device 152. To the light modulation device drive circuit, there is input image data corresponding to the respective primary colors of R, G, and B from the image processor 13. The light modulation device drive circuit converts the image data input thereto into data signals suitable for the operations of the liquid crystal panels as the light modulation elements provided to the light modulation device 152. The light modulation device drive circuit applies a voltage to each pixel of each of the liquid crystal panels based on the data signal thus converted, and draws an image on each of the liquid crystal panels.

The projection unit 15 is provided with a light source 151, the light modulation device 152, and an optical unit 153.

The light source 151 is provided with a light source such as a xenon lamp, a super-high pressure mercury lamp, an LED, or a laser source. Further, the light source 151 can also be provided with a reflector and an auxiliary reflector for guiding light emitted by the light source to the light modulation device 152.

The light modulation device 152 is provided with modulation elements such as transmissive liquid crystal panels. The light modulation device 152 modulates the light entering the light modulation device 152 from the light source 151 to form the image light in accordance with the data signals input from the drive circuit. The image light is typically color image light including visible light of three colors of red (R), green (G), and blue (B). The light modulation device 152 is not limited to the transmissive liquid crystal panels, and can be, for example, reflective liquid crystal panels, or can also be DMDs (Digital Micromirror Devices).

The optical unit 153 emits the image light formed by the light modulation device 152 to the projection surface 2 to form an image on the projection surface 2. The optical unit 153 includes at least one of a lens and a mirror. The optical unit 153 can also be provided with a zoom mechanism for expanding or reducing the image projected on the projection surface 2, and a focus adjustment mechanism for performing a focus adjustment.

An emitter 16 emits the detection light LT for detecting the finger 5 in a direction including the projection surface 2. In FIG. 3, the detection light LT is represented by a dotted line. The emitter 16 is provided with an LD (Laser Diode) or an LED as the light source for emitting the infrared light.

Further, it is also possible for the emitter 16 to be provided with an optical component for diffusing the infrared light emitted by the light source toward the projection surface 2.

The infrared camera 17 is provided with an imaging element such as a CMOS (Complementary Metal Oxide Semiconductor) or a CCD (Charge Coupled Device) for receiving the detection light LT emitted by the finger 5. Further, the infrared camera 17 is provided with an optical system for forming an image on the imaging element, a diaphragm for limiting light entering the imaging element, and so on.

The infrared camera 17 images a range including the projection surface 2 to form a taken image. The infrared camera 17 receives the detection light LT emitted by the finger 5 to perform imaging. The image data of the taken image generated by the infrared camera 17 is output to the first controller 10.

The taken image is an example of an output value in the present disclosure.

The first processor 100 retrieves and then executes the first control program 111 stored in the first memory 110 to thereby function as a first operation detector 101 and a projection controller 102.

The first operation detector 101 detects a gesture operation by the user. The first operation detector 101 detects a gesture operation based on the taken image obtained by imaging by the infrared camera 17.

The first operation detector 101 detects a first gesture operation by one hand 4 of the user. In the present embodiment, the first gesture operation is an operation of moving the hand 4 having a first shape into a range HA. More particularly, the first gesture operation in the present embodiment is an operation of moving a part of the hand 4 having the first shape into the range HA. Further more particularly, the first gesture operation in the present embodiment is an operation of moving the finger 5 of the hand 4 having the first shape into the range HA. It should be noted that in the present embodiment, there is illustrated the hand 4 in the state of erecting one finger 5 as the hand 4 having the first shape. When a single image of the detection light LT shows up in the taken image, the first operation detector 101 detects the first gesture operation.

The first operation detector 101 detects a second gesture operation by one hand 4 of the user. In the present embodiment, the second gesture operation is an operation of moving the hand 4 having a second shape different from the first shape in the range HA as much as a distance no shorter than a first distance. More particularly, the second gesture operation in the present embodiment is an operation of moving a part of the hand 4 having the second shape in the range HA as much as the distance no shorter than the first distance. Further more particularly, the second gesture operation in the present embodiment is an operation of moving the finger 5 of the hand 4 having the second shape in the range HA as much as the distance no shorter than the first distance. It should be noted that in the present embodiment, there is illustrated the hand 4 in the state of erecting two fingers 5 as the hand 4 having the second shape. The first distance is a distance corresponding to a predetermined number of pixels in the taken image. When two images of the detection light LT show up in the taken image, a distance between the two images is shorter than a predetermined number of pixels, and at the same time, the two images move in the taken image as much as a distance no shorter than the pixels corresponding to the first distance, the first operation detector 101 detects the second gesture operation.

The first operation detector 101 detects a third gesture operation by one hand 4 of the user. In the present embodiment, the third gesture operation is an operation of moving the hand 4 having the first shape in the range HA as much as a distance no shorter than a second distance. More particularly, the third gesture operation in the present embodiment is an operation of moving a part of the hand 4 having the first shape in the range HA as much as the distance no shorter than the second distance. Further more particularly, the third gesture operation in the present embodiment is an operation of moving the finger 5 of the hand 4 having the first shape in the range HA as much as the distance no shorter than the second distance. The second distance is a distance corresponding to a predetermined number of pixels in the taken image. The second distance can be the same distance as the first distance, or can also be a different distance from the first distance. When a single image of the detection light LT shows up in the taken image, and at the same time, the single image moves in the taken image as much as a distance no shorter than the pixels corresponding to the second distance, the first operation detector 101 detects the third gesture operation.

The first operation detector 101 detects a fourth gesture operation by one hand 4 of the user. In the present embodiment, the fourth gesture operation is an operation in which an operation of moving the hand 4 having the first shape into the range HA and then moving the hand 4 outside the range HA is performed L times in a predetermined period. More particularly, the fourth gesture operation in the present embodiment is an operation in which an operation of moving a part of the hand 4 having the first shape into the range HA and then moving the part of the hand 4 outside the range HA is performed L times in the predetermined period. Further more particularly, the fourth gesture operation in the present embodiment is an operation in which an operation of moving the finger 5 of the hand 4 having the first shape into the range HA and then moving the finger 5 of the hand 4 outside the range HA is performed L times in the predetermined period. Here, the character L is an integer equal to or greater than 1. In the present embodiment, there is illustrated when the character L is 2. When the single image of the detection light LT shows up twice in a predetermined range on the taken image in a predetermined period, the first operation detector 101 detects the fourth gesture operation.

The projection controller 102 controls the image processor 13, the driver 14, and so on to project the projection image on the projection surface 2. Specifically, the projection controller 102 makes the image processor 13 process the image data developed in the frame memory 12. On this occasion, the projection controller 102 retrieves a parameter which is necessary for the image processor 13 to perform the processing from the first memory 110, and then outputs the parameter to the image processor 13. Further, the projection controller 102 controls the driver 14 to make the light source drive circuit put the light source 151 on, make the light modulation device drive circuit to drive the light modulation device 152, and make the projection unit 15 emit the image light to display an image on the projection surface 2. Further, the projection controller 102 controls the optical unit 153 to start up the motor to control the zoom and the focus of the optical unit 153.

The projection controller 102 in the present embodiment changes a display mode of the control points 203 based on the gesture operation detected by the first operation detector 101 during a period in which the projector 1 projects the point correction UI 200. The projection controller 102 instructs the image processor 13 to change the display mode of the control points 203 to thereby change the display mode of the control points 203 based on the gesture operation detected by the first operation detector 101.

The projection controller 102 in the present embodiment moves the positions of the control points 203 based on the gesture operation detected by the first operation detector 101 during the period in which the projector 1 projects the point correction UI 200. The projection controller 102 instructs displacement of the control points 203 to the image processor 13 to thereby move the positions of the control points 203. It should be noted that the instruction output from the projection controller 102 to the image processor 13 includes information of a moving direction and a moving distance.

Further, when moving the positions of the control points 203 in the point correction UI 200, the projection controller 102 of the present embodiment corrects the projection image in accordance with the displacement of the control points 203. The projection controller 102 performs an instruction of moving a pixel corresponding to the position of the control point 203 as a movement target, and peripheral pixels located on the periphery of that pixel on the image processor 13 to thereby correct the projection image.

First, the point correction UI 200 when the first operation detector 101 has detected the first gesture operation will be described.

Figure 5:
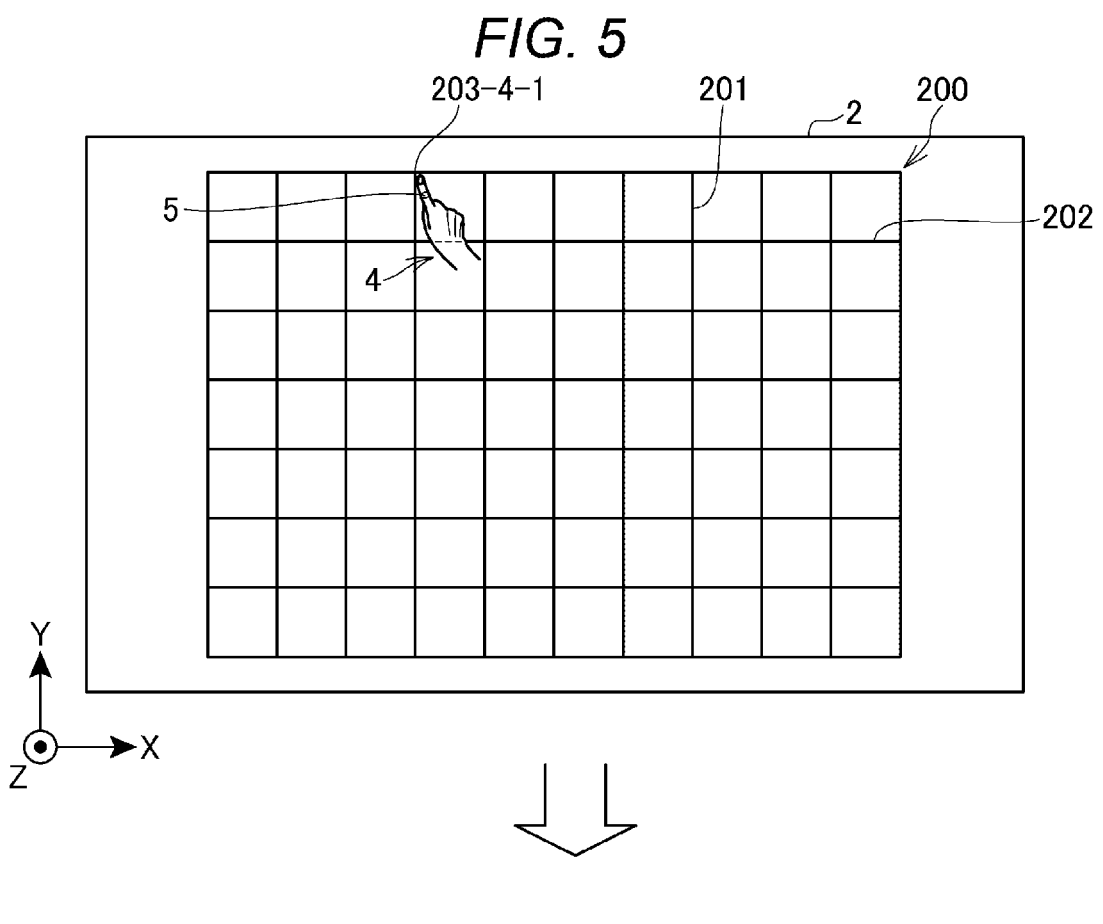
FIG. 5 is a diagram showing an example of the point correction UI.
Figure 5:
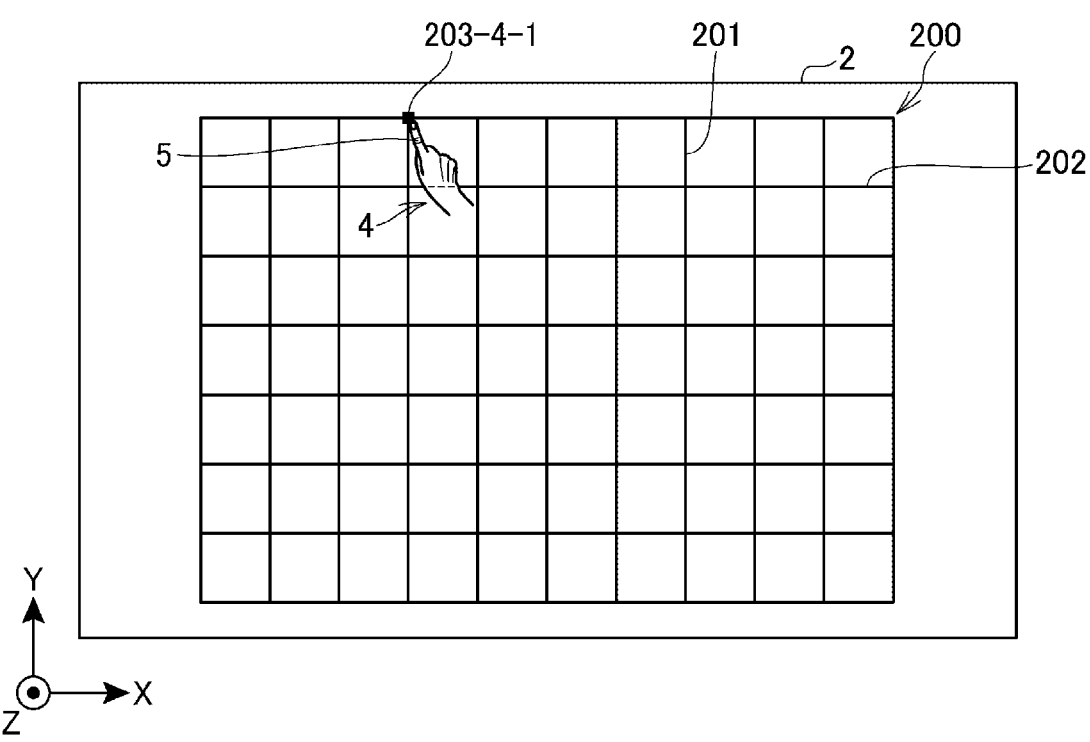

FIG. 5 is a diagram showing an example of the point correction UI 200 when the first operation detector 101 has detected the first gesture operation.

When the first operation detector 101 has detected the first gesture operation, the projection controller 102 identifies the control point 203 selected by the user based on the position of the hand 4 in the taken image. Hereinafter, the control point 203 selected by the user is referred to as a first control point, and the control point 203 which is not selected by the user is referred to as a second control point. The projection controller 102 identifies the first control point based on the taken image by the infrared camera 17. The projection controller 102 identifies a coordinate in the frame memory 12 corresponding to a position of the image of the detection light LT in the taken image by the infrared camera 17 with reference to the first calibration data 112. Then, the projection controller 102 refers to the second calibration data 113, and when the coordinate in the frame memory 12 thus identified is the coordinate corresponding to the control point 203, the projection controller 102 identifies the control point 203 corresponding to the coordinate in the frame memory thus identified as the first control point.

The projection controller 102 changes the display mode of the control point 203 identified as the first control point from a second display mode to a first display mode different from the second display mode. The second display mode is a display mode representing a selection cancel state as a state in which the selection is not made. The first display mode is a display mode representing a selection state as a state in which the selection is made. The first display mode and the second display mode are different from each other in color, shape, size, or the like. It should be noted that the display mode of the control point 203 as the second control point is the second display mode.

In FIG. 5, there is shown when the user selects the control point 203-4-1 using the first gesture operation when all of the control points 203 are the second control points. In the case of FIG. 5, the projection controller 102 identifies the control point 203-4-1 as the first control point, and then changes the display mode of the control point 203-4-1 from the second display mode to the first display mode.

Then, the point correction UI 200 when the first operation detector 101 has detected the third gesture operation will be described.

Figure 6:
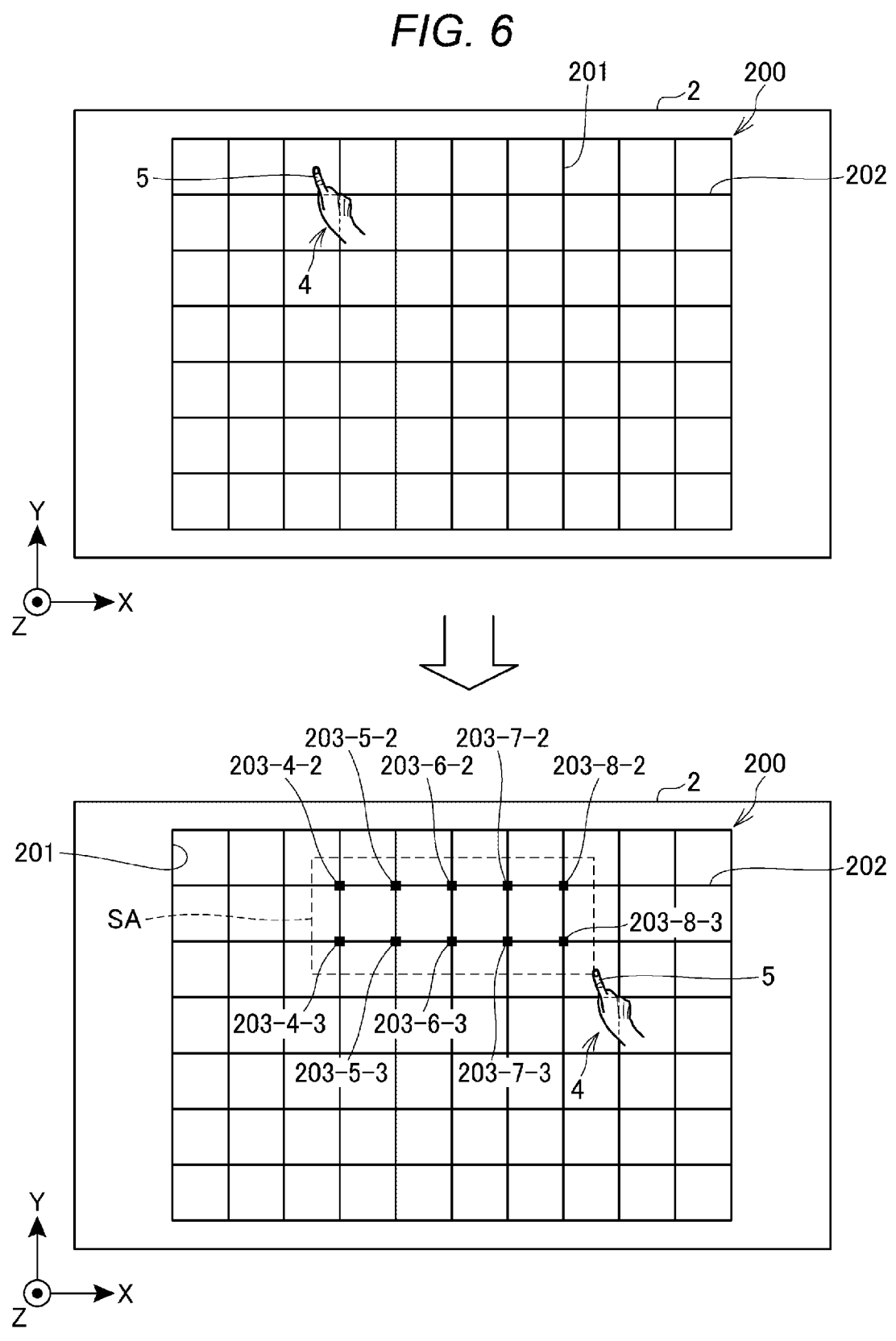

FIG. 6 is a diagram showing an example of the point correction UI 200 when the first operation detector 101 has detected the third gesture operation.

When the first operation detector 101 has detected the third gesture operation, the projection controller 102 identifies a setting area SA in the point correction UI 200 with reference to the first calibration data 112. The setting area SA is an area on the point correction UI 200 set by the user with the third gesture operation. For example, the projection controller 102 identifies a rectangular area, which takes a moving start position and a moving end position of the hand 4 in the third gesture operation as corners opposed to each other, as the setting area SA. Then, the projection controller 102 identifies the control point 203 included in the setting area SA thus identified as the first control point with reference to the second calibration data 113. When the projection controller 102 identifies the first control point, the projection controller 102 changes the display mode of the control point 203 identified as the first control point from the second display mode to the first display mode.

In FIG. 6, there is shown when the user sets the setting area SA including the 10 control points 203 on the point correction UI 200 when all of the control points 203 are the second control points. In FIG. 6, the control points 203-4-2, 203-5-2, 203-6-2, 203-7-2, 203-8-2, 203-4-3, 203-5-3, 203-6-3, 203-7-3, and 203-8-3 are included in the setting area SA. In the case of FIG. 6, the projection controller 102 identifies these 10 control points 203 as the first control points, and then changes the display mode of these 10 control points 203 identified as the first control points from the second display mode to the first display mode.

Then, the point correction UI 200 when the first operation detector 101 has detected the second gesture operation will be described.

Figure 7:
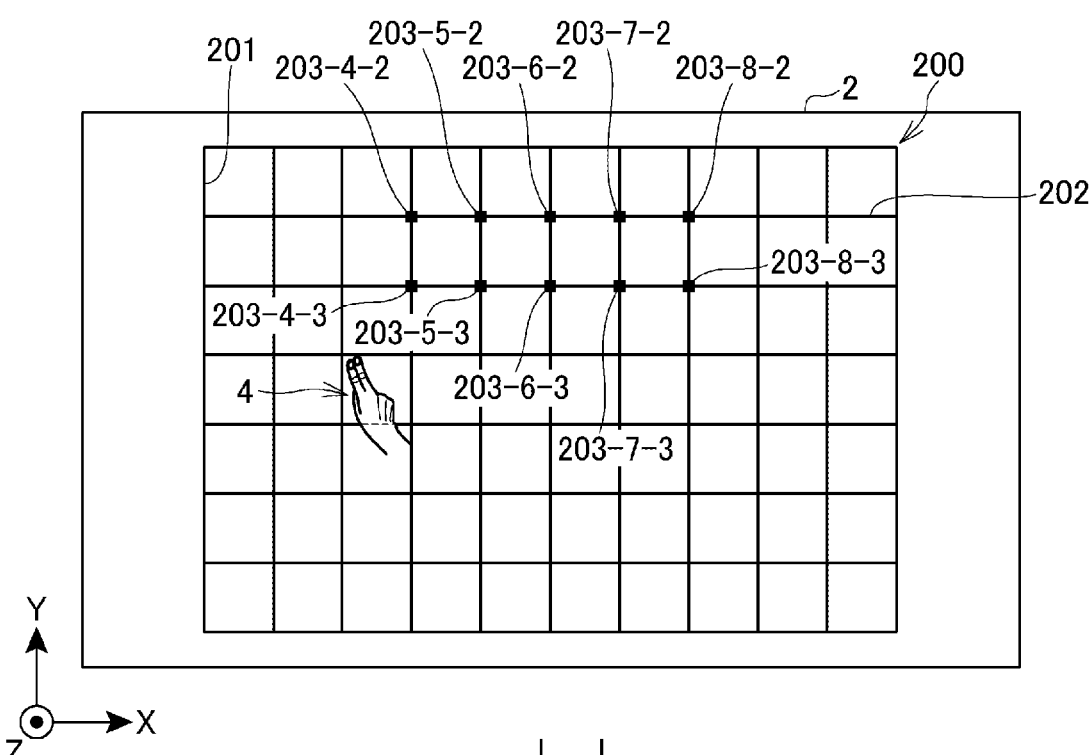
FIG. 7 is a diagram showing an example of the point correction UI.
Figure 7:
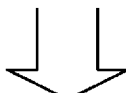
Figure 7:
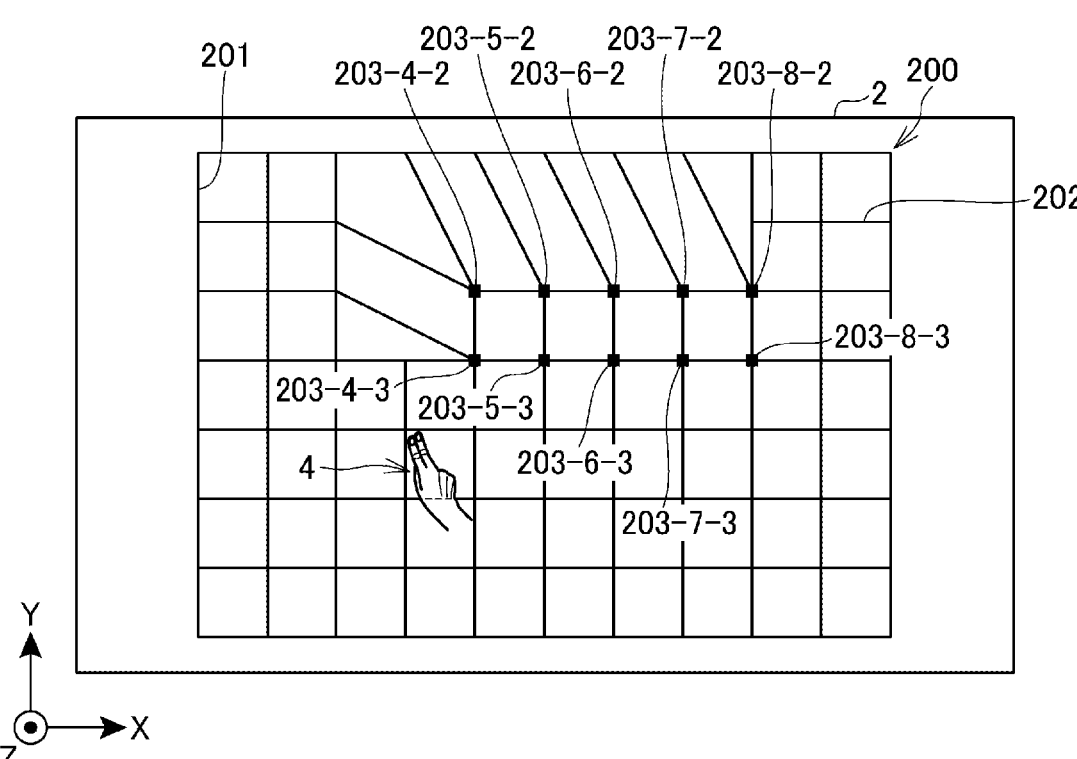

FIG. 7 is a diagram showing an example of the point correction UI 200 when the first operation detector 101 has detected the second gesture operation.

When the first operation detector 101 has detected the second gesture operation, the projection controller 102 moves the positions of the first control points from first positions to second positions in accordance with the movement of the hand 4 in the second gesture operation. The first positions are positions before the movement by the second gesture operation, and the second positions are positions to which the first control points are moved by the second gesture operation. The projection controller 102 identifies the moving distance and the moving direction of the hand 4 in the second gesture operation with reference to the first calibration data 112, and moves the positions of the first control points in accordance with the moving distance and the moving direction thus identified. The projection controller 102 corrects the projection image in accordance with the displacement of the first control points. It should be noted that the point correction UI 200 in which the positions of the first control points are the first positions is an example of a first image in the present disclosure, and the point correction UI 200 in which the positions of the first control points are the second positions is an example of a second image in the present disclosure.

In FIG. 7, there is shown when the second gesture operation of moving toward a lower right direction is detected when the control points 203-4-2, 203-5-2, 203-6-2, 203-7-2, 203-8-2, 203-4-3, 203-5-3, 203-6-3, 203-7-3, and 203-8-3 are the first control points. In the case of FIG. 7, the projection controller 102 moves the positions of these 10 control points 203 toward the lower right direction in the point correction UI 200.

Then, the point correction UI 200 when the first operation detector 101 has detected the fourth gesture operation will be described.

Figure 8:
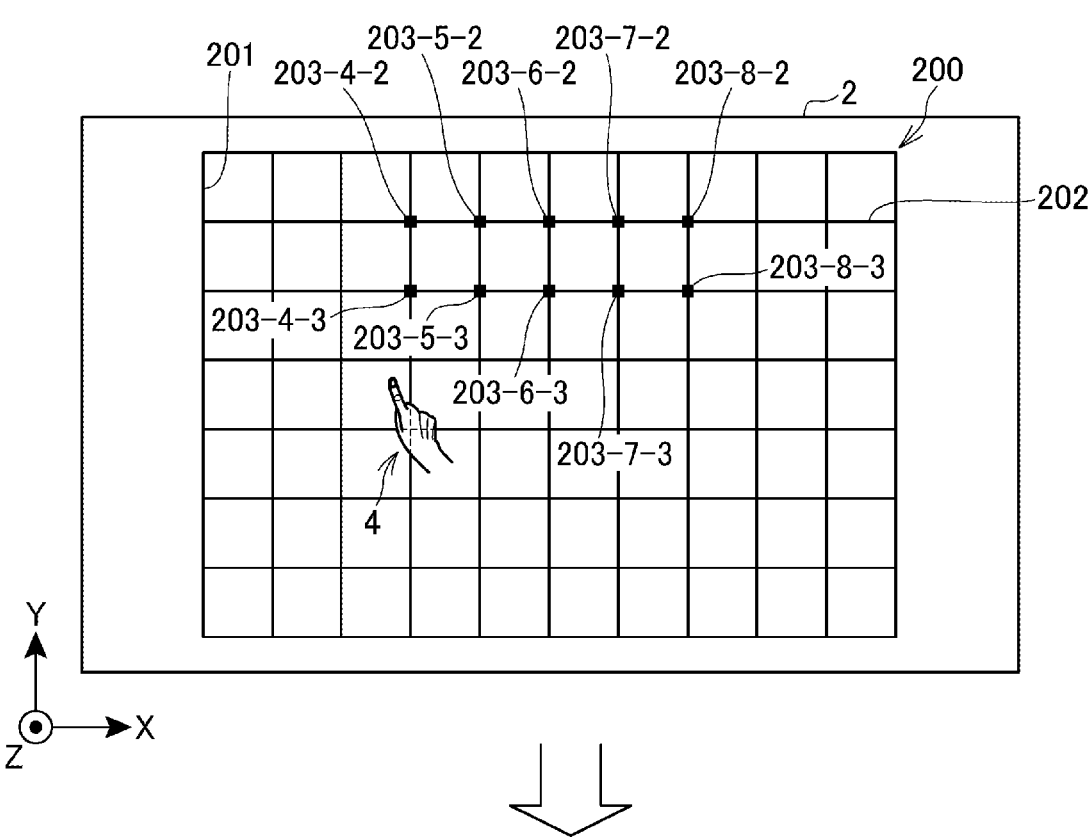
FIG. 8 is a diagram showing an example of the point correction UI.
Figure 8:
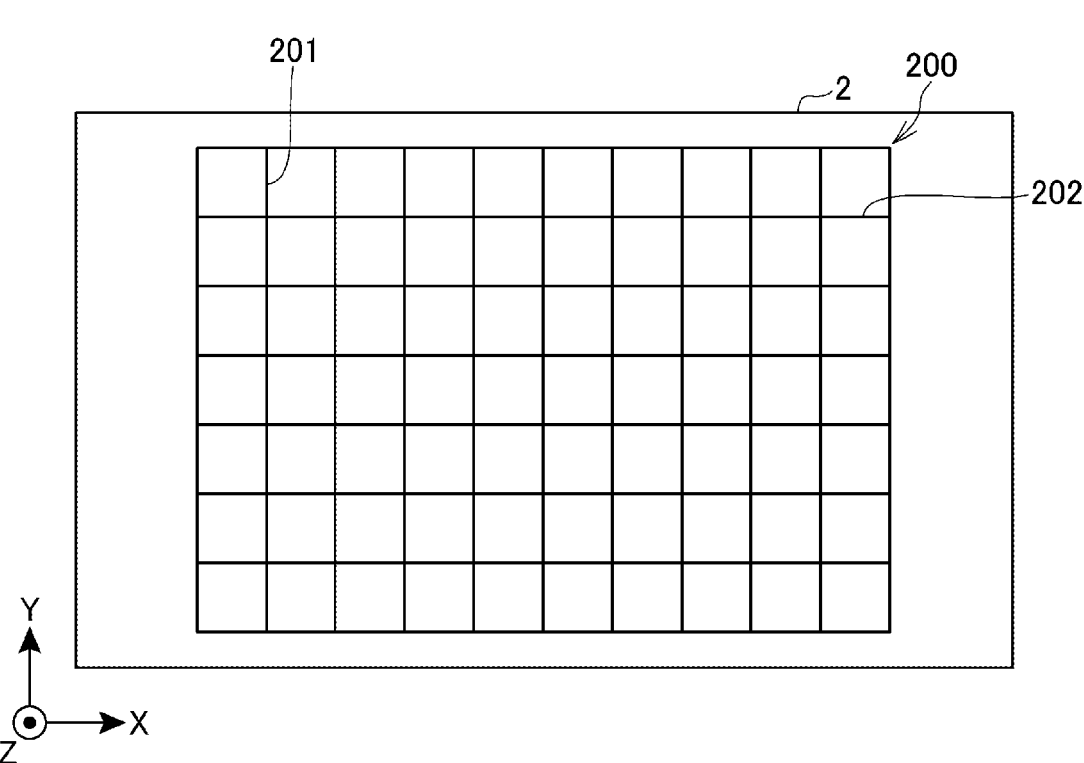

FIG. 8 is a diagram showing an example of the point correction UI 200 when the first operation detector 101 has detected the fourth gesture operation.

The projection controller 102 changes the first control points to the second control points when the first operation detector 101 has detected the fourth gesture operation when the point correction UI 200 includes the first control points.

In FIG. 8, there is shown when the first operation detector 101 has detected the fourth gesture operation when the control points 203-4-2, 203-5-2, 203-6-2, 203-7-2, 203-8-2, 203-4-3, 203-5-3, 203-6-3, 203-7-3, and 203-8-3 are the first control points. In the case of FIG. 8, the projection controller 102 changes these 10 first control points to the second control points.

Then, an operation of the projector 1 when projecting the point correction UI 200 will be described.

Figure 9:
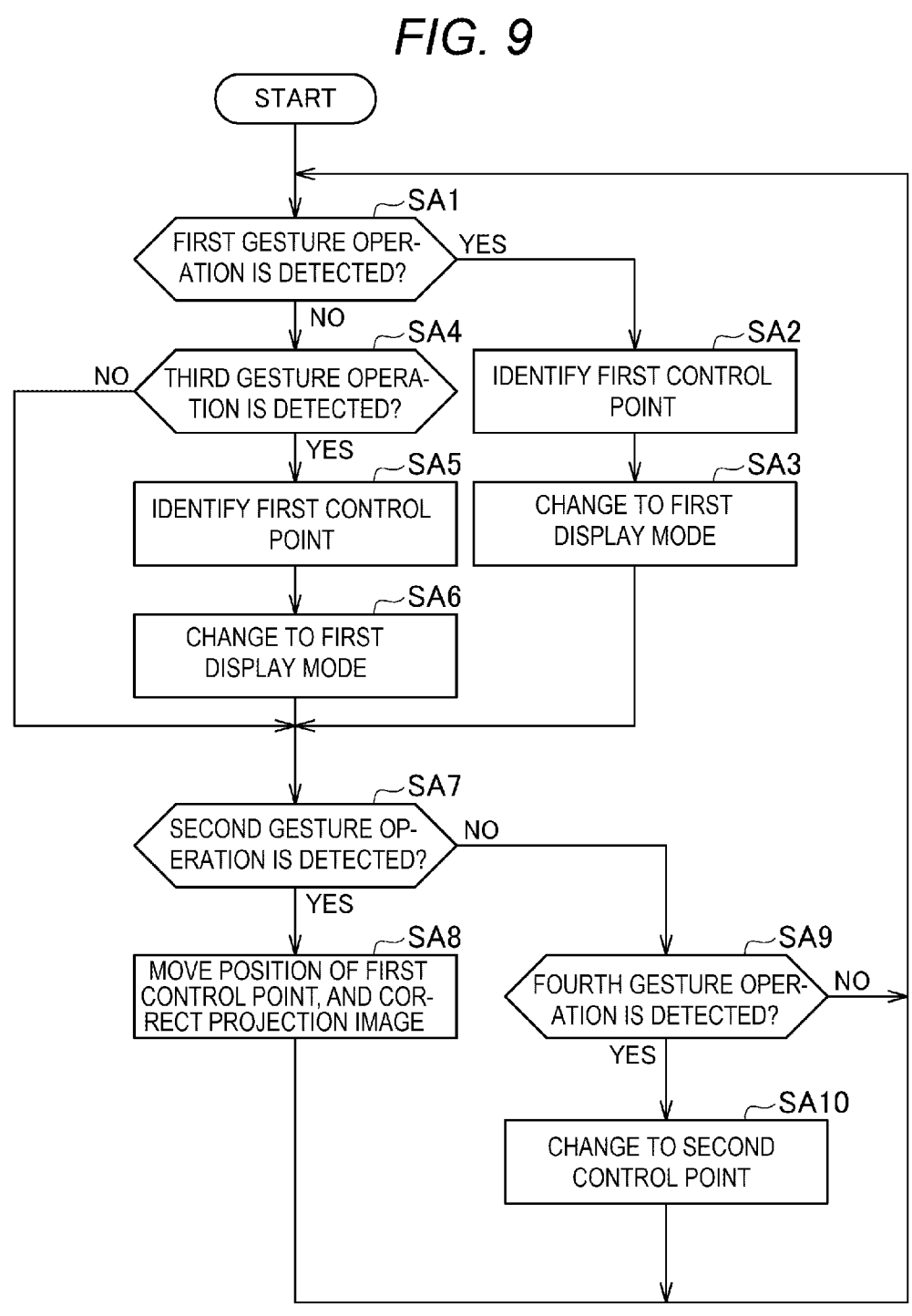
FIG. 9 is a flowchart showing an operation of the projector.

FIG. 9 is a flowchart showing the operation of the projector 1.

The projection controller 102 determines (step SA1) whether or not the first operation detector 101 has detected the first gesture operation.

When the projection controller 102 determines that the first operation detector 101 has detected the first gesture operation (YES in the step SA1), the projection controller 102 identifies (step SA2) the control point 203 selected with the first gesture operation as the first control point, and then the projection controller 102 changes (step SA3) the display mode of the control point 203 thus identified as the first control point to the first display mode, and then performs the processing in the step SA7.

Going back to the description of the step SA1, when the projection controller 102 determines that the first operation detector 101 has not detected the first gesture operation (NO in the step SA1), the projection controller 102 determines (step SA4) whether or not the first operation detector 101 has detected the third gesture operation.

When the projection controller 102 determines that the first operation detector 101 has not detected the third gesture operation (NO in the step SA4), the projection controller 102 performs the processing in the step SA7.

In contrast, when the projection controller 102 determines that the first operation detector 101 has detected the third gesture operation (YES in the step SA4), the projection controller 102 identifies (step SA5) the control point 203 included in the setting area SA as the first control point. Subsequently, the projection controller 102 changes (step SA6) the display mode of the control point 203 identified as the first control point to the first display mode.

Subsequently, the projection controller 102 determines (step SA7) whether or not the first operation detector 101 has detected the second gesture operation.

When the projection controller 102 determines that the first operation detector 101 has detected the second gesture operation (YES in the step SA7), the projection controller 102 moves the position of the first control point, and further, corrects the projection image in accordance with the displacement of the first control point (step SA8).

In contrast, when the projection controller 102 determines that the first operation detector 101 has not detected the second gesture operation (NO in the step SA7), the projection controller 102 determines (step SA9) whether or not the first operation detector 101 has detected the fourth gesture operation.

When the projection controller 102 determines that the first operation detector 101 has not detected the fourth gesture operation (NO in the step SA9), the projection controller 102 performs the determination in the step SA1 once again.

In contrast, when the projection controller 102 determines that the first operation detector 101 has detected the fourth gesture operation (YES in the step SA9), the projection controller 102 changes (step SA10) the first control point to the second control point.

When the projection controller 102 performs the processing in the step SA8 or the step SA10, the projection controller 102 returns the process to the step SA1 to perform the processing in the step SA1 and the subsequent steps once again.

Second Embodiment

Then, a second embodiment will be described.

Figure 10:
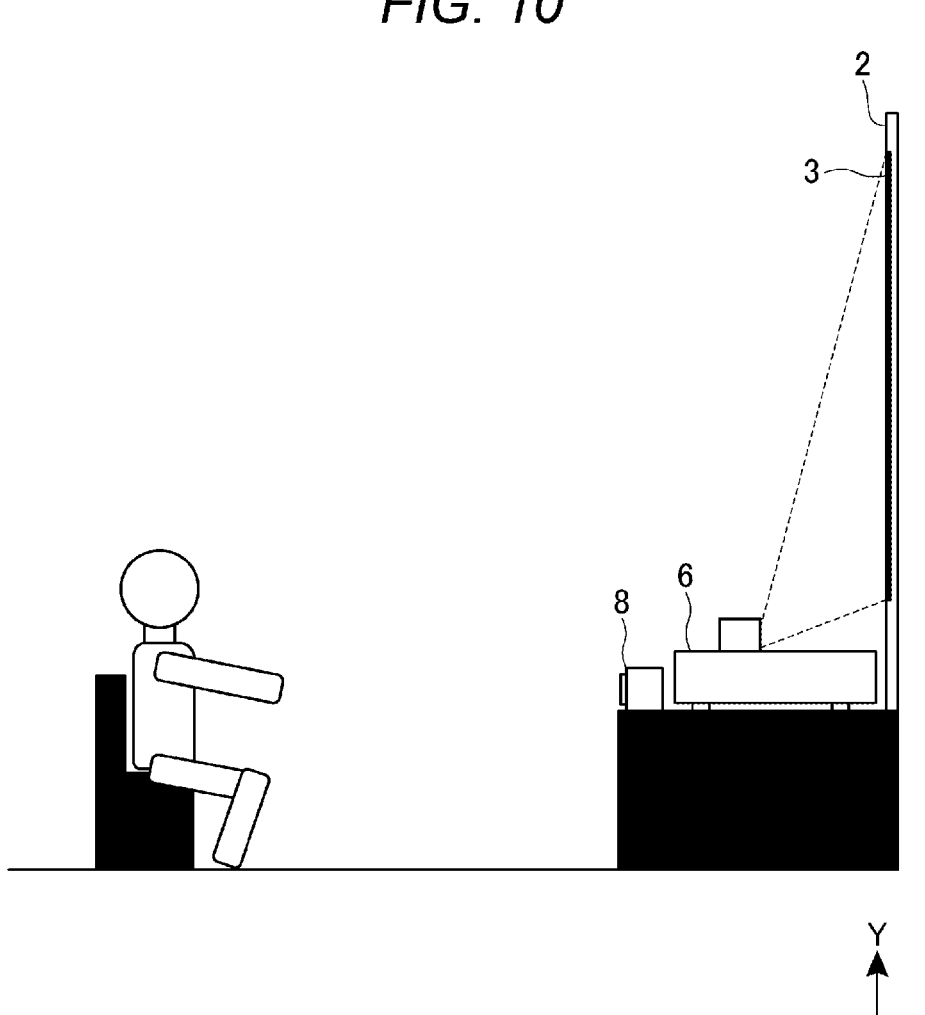
FIG. 10 is a diagram showing an installation aspect of the projector.
Figure 11:
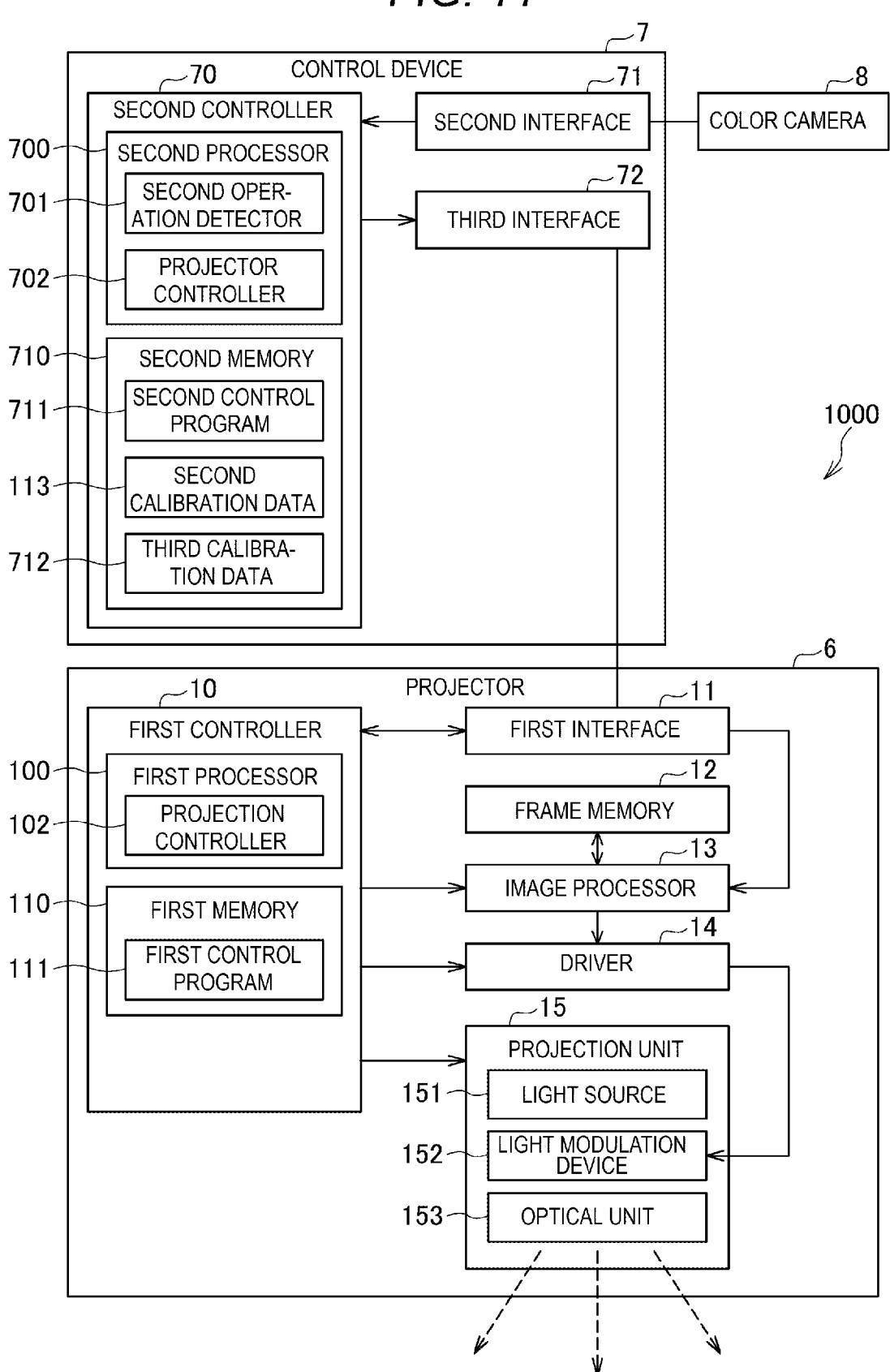
FIG. 11 is a diagram showing a configuration of a projection system.

FIG. 10 is a diagram showing an example of an installation aspect of a projector 6 in the second embodiment. FIG. 11 is a diagram showing a configuration of a projection system 1000 equipped with the projector 6 in the second embodiment.

As shown in FIG. 10, the projector 6 according to the second embodiment emits the image light to the projection surface 2 located behind the projector 6. The projector 6 according to the second embodiment is coupled to a control device 7, and performs projection of the point correction UI 200, a change of the display mode of the control point 203, a displacement of the control point 203, and a correction of the projection image corresponding to the displacement of the control point 203 in accordance with control by the control device 7.

The projection system 1000 equipped with the projector 6 according to the second embodiment is provided with the projector 6, the control device 7, and a color camera 8.

The color camera 8 is an example of the sensor in the present disclosure.

As shown in FIG. 10, the color camera 8 is installed so as to take an image in front of the projector 6. The color camera 8 is coupled to the control device 7 to transmit image data of the taken image obtained by imaging to the control device 7.

The control device 7 is provided with a second processor 700 for executing a program such as a CPU or an MPU, and a second memory 710, and controls each part of the control device 7. Functional units of the second processor 700 will be described later. The second processor 700 is an example of at least one processor in the present disclosure.

The second memory 710 stores a program to be executed by the second processor 700, and data to be processed by the second processor 700. The second memory 710 stores a second control program 711 to be executed by the second processor 700, the second calibration data 113, third calibration data 712, and other various types of data. The second memory 710 has a nonvolatile storage area. The second memory 710 can be provided with a volatile storage area to form a work area for the second processor 700. The second memory 710 is formed of, for example, a ROM (Read Only Memory) and a RAM (Random Access Memory).

The third calibration data 712 is data of associating a taken image by the color camera 8 and the projection region 3 with each other. More specifically, the third calibration data 712 is data for making coordinates of pixels in a coordinate system of the taken image by the color camera 8 and coordinates of pixels in the coordinate system of the frame memory 12 of the projector 6 correspond to each other.

The control device 7 is provided with a second interface 71 and a third interface 72.

The second interface 71 is an interface provided with hardware compliant with a predetermined communication standard such as a communication circuit, and communicates with the color camera 8.

The third interface 72 is an interface provided with hardware compliant with a predetermined communication standard such as a communication circuit, and communicates with the projector 6.

The second processor 700 functions as a second operation detector 701 and a projector controller 702.

The second operation detector 701 detects the gesture operation by the user. The second operation detector 701 detects the gesture operation based on the taken image by the color camera 8.

The second operation detector 701 detects the first gesture operation. The first gesture operation in the present embodiment is the same as the first gesture operation described in the first embodiment. When an image of the hand 4 having the first shape no smaller than a predetermined area shows up in the taken image, the second operation detector 701 detects the first gesture operation. The predetermined area is the area which defines whether or not the position of the hand 4 is within the range HA, and is determined in advance by a test or a simulation. It should be noted that the second operation detector 701 detects the shape of the hand 4 showing up in the taken image by the color camera 8 using a predetermined method such as pattern matching or a machine learning result.

The second operation detector 701 detects the second gesture operation. The second gesture operation in the present embodiment is the same as the second gesture operation described in the first embodiment. When an image of the hand 4 having the second shape no smaller than a predetermined area moves in the taken image as much as a distance no shorter than the pixels corresponding to the first distance, the second operation detector 701 detects the second gesture operation.

The second operation detector 701 detects the third gesture operation. The third gesture operation in the present embodiment is the same as the third gesture operation described in the first embodiment. When the image of the hand 4 having the first shape no smaller than the predetermined area moves in the taken image as much as a distance no shorter than the pixels corresponding to the second distance, the second operation detector 701 detects the third gesture operation.

The second operation detector 701 detects the fourth gesture operation. The fourth gesture operation in the present embodiment is the same as the fourth gesture operation described in the first embodiment. When the image of the hand 4 having the first shape no smaller than the predetermined area shows up within a predetermined range on the taken image twice in a predetermined period, the second operation detector 701 detects the fourth gesture operation.

The projector controller 702 communicates with the projector 6 via the third interface 72. The projector 702 transmits the control data to the projector 6 to thereby control the projector 6. The projector controller 702 makes the projector 6 project the point correction UI 200.

When the second operation detector 701 has detected the first gesture operation, the projector controller 702 identifies the control point 203 selected by the user based on the position of the hand 4 in the taken image by the color camera 8. The projector controller 702 identifies a coordinate in the frame memory 12 corresponding to the position of the image of the hand 4 in the taken image by the color camera 8 with reference to the third calibration data 712. Then, the projector controller 702 refers to the second calibration data 113, and when the coordinate in the frame memory 12 thus identified is the coordinate corresponding to the control point 203, the projection controller 102 identifies the control point 203 corresponding to the coordinate in the frame memory 12 thus identified as the first control point.

When the projector controller 702 identifies the first control point, the projector controller 702 transmits control data for changing the display mode of the control point 203 identified as the first control point from the second display mode to the first display mode to the projector 6. The control data includes the coordinate in the frame memory 12 corresponding to the control point 203 as a change target.

When the second operation detector 701 has detected the third gesture operation, the projector controller 702 identifies the setting area SA in the point correction UI 200 with reference to the third calibration data 712. Then, the projector controller 702 identifies the control point 203 included in the setting area SA thus identified as the first control point with reference to the second calibration data 113.

When the projector controller 702 identifies the first control point, the projector controller 702 transmits the control data for changing the display mode of the control point 203 identified as the first control point from the second display mode to the first display mode to the projector 6.

When the second operation detector 701 has detected the second gesture operation, the projector controller 702 moves the position of the first control point from the first position to the second position in accordance with the movement of the hand 4 in the second gesture operation. The projector controller 702 identifies the moving distance and the moving direction of the hand 4 in the second gesture operation with reference to the first calibration data 112, and moves the position of the first control point in accordance with the moving distance and the moving direction thus identified. The projector controller 702 transmits the control data to the projector 6 to thereby move the position of the first control point. The control data is data for moving the position of the first control point, and at the same time, correcting the projection image in accordance with the displacement of the first control point. In the control data, there are described the coordinate in the frame memory 12 corresponding to the control point 203 as the movement target, the moving direction, and the moving distance as the information.

When the second operation detector 701 has detected the fourth gesture operation, the projector controller 702 makes the projector 6 change the first control point to the second control point. The projector controller 702 transmits the control data for performing the change to the second control point to the projector 6 to thereby make the projector 6 change the first control point to the second control point.

As shown in FIG. 11, the projector 6 is provided with substantially the same configuration as that of the projector 1 according to the first embodiment. It should be noted that regarding the configuration of the projector 6 according to the second embodiment, the same constituents as in the first embodiment are denoted by the same reference symbols, and the detailed description thereof will be omitted.

As shown in FIG. 11, the first processor 100 of the projector 6 functions as the projection controller 102.

The projection controller 102 in the second embodiment projects the point correction UI 200 in accordance with the control data transmitted by the control device 7. Further, the projection controller 102 in the second embodiment changes the display mode of the control point 203 identified as the first control point to the first display mode in accordance with the control data transmitted by the control device 7. Further, the projection controller 102 in the second embodiment moves the position of the first control point, and at the same time, corrects the projection image so as to correspond to the displacement of the first control point in accordance with the control data transmitted by the control device 7. Further, the projection controller 102 in the second embodiment changes the first control point to the second control point in accordance with the control data transmitted by the control device 7.

Then, an operation of the control device 7 when the projector 6 projects the point correction UI 200 will be described.

FIG. 12 is a flowchart showing the operation of the control device 7.

The projector controller 702 determines (step SB1) whether or not the second operation detector 701 has detected the first gesture operation.

When the projector controller 702 determines that the second operation detector 701 has detected the first gesture operation (YES in the step SB1), the projector controller 702 identifies (step SB2) the control point 203 selected by the first gesture operation as the first control point. Then, the projector controller 702 transmits (step SB3) the control data of changing the display mode of the control point 203 identified as the first control point to the first display mode to the projector 6 via the third interface 72, and then performs the processing in the step SB7.

Going back to the description of the step SB1, when the projector controller 702 determines that the second operation detector 701 has not detected the first gesture operation (NO in the step SB1), the projector controller 702 determines (step SB4) whether or not the second operation detector 701 has detected the third gesture operation.

When the projector controller 702 determines that the second operation detector 701 has not detected the third gesture operation (NO in the step SB4), the projector controller 702 performs the processing in the step SB7.

In contrast, when the projector controller 702 determines that the second operation detector 701 has detected the third gesture operation (YES in the step SB4), the projector controller 702 identifies (step SB5) the control point 203 included in the setting area SA as the first control point. Subsequently, the projector controller 702 transmits (step SB6) the control data of changing the display mode of the control point 203 identified as the first control point to the first display mode to the projector 6.

Then, the projector controller 702 determines (step SB7) whether or not the second operation detector 701 has detected the second gesture operation.

When the projector controller 702 determines that the second operation detector 701 has detected the second gesture operation (YES in the step SB7), the projector controller 702 transmits (step SB8) the control data of moving the position of the first control point, and further, correcting the projection image in accordance with the displacement of the first control point to the projector 6.

In contrast, when the projector controller 702 determines that the second operation detector 701 has not detected the second gesture operation (NO in the step SB7), the projector controller 702 determines (step SB9) whether or not the second operation detector 701 has detected the fourth gesture operation.

When the projector controller 702 determines that the second operation detector 701 has not detected the fourth gesture operation (NO in the step SB9), the projector controller 702 returns the process to the step SB1.

In contrast, when the projector controller 702 determines that the second operation detector 701 has detected the fourth gesture operation (YES in the step SB9), the projector controller 702 transmits (step SB10) the control data of changing the first control point to the second control point to the projector 6.

When the projector controller 702 performs the processing in the step SB8 or the step SB10, the projector controller 702 returns the process to the step SB1 to perform the processing in the step SB1 and the subsequent steps once again.

Other Embodiments

The embodiments described above are each a preferred embodiment of the present disclosure. It should be noted that the present disclosure is not limited to the embodiments described above, but can be implemented with a variety of modifications within the scope or the spirit of the present disclosure.

In the first embodiment described above, there is illustrated the infrared camera 17 as the sensor in the present disclosure, and in the second embodiment described above, there is illustrated the color camera 8 as the sensor in the present disclosure. However, the sensor in the present disclosure is not limited to the cameras illustrated in the embodiments. As the sensor in the present disclosure, any sensors can be adopted as long as the first processor 100 or the second processor 700 can identify the gesture operation of the user with those sensors, and it is possible to adopt, for example, a temperature sensor or a range sensor.

In each of the embodiments described above, the state of erecting one of the fingers 5 is illustrated as the first shape, and the state of erecting two of the fingers 5 is illustrated as the second shape. However, it is sufficient for the first shape and the second shape to be shapes different from each other, and the number of fingers 5 to be erected is not limited to the embodiments described above. In other words, it is sufficient for the first shape to be a state of erecting X fingers, and it is sufficient for the second shape to be a state of erecting Y fingers, wherein Y is different from X. Here, X and Y are each an integer no smaller than 0 and no greater than 5.

In each of the embodiments described above, the operation of moving a single hand 4 having the first shape into the range HA is illustrated as the first gesture operation, and the operation of moving a single hand 4 having the second shape within the range HA as much as the distance no shorter than the first distance is illustrated as the second gesture operation. However, it is sufficient for the first gesture operation and the second gesture operation to be different in shape of the hand 4 from each other, and the number of the hands 4, the number of the fingers 5, the shape of the finger 5, and so on are not limited to those in the embodiments described above.

For example, in other embodiments, it is possible to define the first gesture operation as an operation of moving the right hand into the range HA, and define the second gesture operation as an operation of moving the left hand in the range HA as much as a distance no shorter than the first distance.

Further, for example, in other embodiments, it is possible to define the first gesture operation as an operation of moving the hand 4 in the state of not erecting the finger 5 into the range HA, and define the second gesture operation as an operation of moving the hand 4 in the state of erecting an index finger and a middle finger alone in the range HA as much as a distance no shorter than the first distance.

Further, for example, in other embodiments, it is possible to define the first gesture operation as an operation of moving the hand 4 with one of the fingers 5 stretched straight into the range HA, and define the second gesture operation as an operation of moving the hand 4 with one of the fingers 5 bent in the range HA as much as a distance no shorter than the first distance.

Further, for example, in other embodiments, it is possible to define the first gesture operation as an operation of moving one hand into the range HA, and define the second gesture operation as an operation of moving the both hands in the range HA as much as a distance no shorter than the first distance.

In the second embodiment described above, there is described when the color camera 8 is disposed outside the projector 6, but it is possible to adopt a configuration in which the color camera 8 is installed in the projector 6.

Further, it is possible to realize the functions of the first processor 100 and the second processor 700 with a plurality of processors, or a semiconductor chip.

Further, the functional units of the projector 1 shown in FIG. 3 and the functional units of the projector 6 shown in FIG. 11 are those representing the functional configuration thereof, and the specific installation aspects are not particularly limited. In other words, it is not necessarily required to install the hardware individually corresponding to each of the functional units, and it is obviously possible to adopt a configuration of realizing the functions of the plurality of functional units by a single processor executing a program. Further, a part of the function realized by software in the embodiments described above can also be realized by hardware, and a part of the function realized by hardware can also be realized by software. Besides the above, the specific detailed configuration of each of other units of the projectors 1, 6 can arbitrarily be modified within the scope or the spirit of the present disclosure.

Further, the functional units of the control device 7 shown in FIG. 11 are those representing the functional configurations, and the specific installation aspects are not particularly limited. In other words, it is not necessarily required to install the hardware individually corresponding to each of the functional units, and it is obviously possible to adopt a configuration of realizing the functions of the plurality of functional units by a single processor executing a program. Further, a part of the function realized by software in the embodiments described above can also be realized by hardware, and a part of the function realized by hardware can also be realized by software. Besides the above, the specific detailed configuration of each of other units of the control device 7 can arbitrarily be modified within the scope or the spirit of the present disclosure.

Further, the processing units of the flowchart shown in FIG. 9 are obtained by dividing the processing of the projector 1 in accordance with major processing contents in order to make the processing of the projector 1 easy to understand, and the present disclosure is not at all limited by the way of dividing the processing into the processing units or the names of the processing units. It is possible to divide the processing into a larger number of unit steps in accordance with the processing contents. Further, it is also possible to divide the processing so that each of the unit steps includes a larger amount of processing. Further, the order of the steps can arbitrarily be exchanged within a range in which no problem is posed in the scope or the spirit of the present disclosure.

Further, the processing units of the flowchart shown in FIG. 12 are obtained by dividing the processing of the control device 7 in accordance with major processing contents in order to make the processing of the control device 7 easy to understand, and the present disclosure is not at all limited by the way of dividing the processing into the processing units or the names of the processing units. It is possible to divide the processing into a larger number of unit steps in accordance with the processing contents. Further, it is also possible to divide the processing so that each of the unit steps includes a larger amount of processing. Further, the order of the steps can arbitrarily be exchanged within a range in which no problem is posed in the scope or the spirit of the present disclosure.

Further, when realizing the correction method of the projection image using the first processor 100 provided to the projector 1, it is also possible to configure the program to be executed by the first processor 100 as an aspect of a recording medium, or an aspect of a transmission medium for transmitting the program. As the recording medium, there can be used a magnetic or optical recording medium, or a semiconductor memory device. Specifically, there can be cited a portable or rigid recording medium such as a flexible disk, an HDD (Hard Disk Drive), a CD-ROM, a DVD, a Blu-ray disc, a magnetooptic disc, a flash memory, or a card-type recording medium. Further, the recording medium described above can also be a RAM, or a nonvolatile storage device such as a ROM or the HDD as an internal storage device provided to a server device. Blu-ray is a registered trademark.

Further, when realizing the correction method of the projection image using the projection system 1000, it is also possible to configure the program to be executed by the first processor 100 and the second processor 700 as an aspect of a recording medium, or an aspect of a transmission medium for transmitting the program. As the recording medium, there can be used a magnetic or optical recording medium, or a semiconductor memory device.

Conclusion of Present Disclosure

Hereinafter, the conclusion of the present disclosure will supplementarily be noted.

Supplementary Note 1

A method of correcting a projection image including projecting, by a projector, a first image including a plurality of control points configured to correct the projection image on a projection surface, identifying at least one first control point from the plurality of control points based on a position of at least one of hands of a user in the first image when a first gesture operation by at least one of the hands of the user is detected based on an output value of a sensor, and projecting, by the projector, a second image obtained by moving a position of the at least one first control point from a first position to a second position based on a position of at least one of the hands of the user in the first image on the projection surface when a second gesture operation by at least one of the hands of the user different from the first gesture operation is detected based on an output value of the sensor.

According to the above, the operation of selecting the control point to be the movement target and the operation of moving the control point are associated with the respective gesture operations different from each other. Therefore, it is possible to prevent an occurrence of an erroneous operation that the control point unintended by the user moves to a position unintended by the user in the correction of the projection image.

Supplementary Note 2

The method of correcting the projection image described in Supplementary Note 1, wherein the first gesture operation is an operation of moving at least one of the hands of the user having a first shape into a range in which a distance from the projection surface is equal to or shorter than a threshold value, and the second gesture operation is an operation of moving at least one of the hands of the user having a second shape different from the first shape in the range as much as a distance equal to or longer than a first distance.

According to the above, since the shape of the hand in the first gesture operation and the shape of the hand in the second gesture operation are different from each other, and at the same time, the first gesture operation and the second gesture operation are different from each other, it is possible to further prevent the occurrence of the erroneous operation that the control point unintended by the user moves to a position unintended by the user in the correction of the projection image.

Supplementary Note 3

The method of correcting the projection image described in Supplementary Note 2, wherein the identifying at least one first control point includes when a third gesture operation is detected based on an output value of the sensor, identifying a setting area set by the third gesture operation in the first image, and identifying a control point included in the setting area out of the plurality of control points as the at least one first control point, and the third gesture operation is an operation of moving at least one of the hands of the user having the first shape in the range as much as a distance equal to or longer than a second distance.

According to the above, it becomes possible to select a plurality of control points included in the setting area in a lump with the third gesture operation. Therefore, in the correction of the projection image, it is not necessary for the user to select two or more control points one by one. Therefore, it is possible to prevent an occurrence of an erroneous operation that the control point unintended by the user moves to a position unintended by the user in the correction of the projection image, and at the same time, it is possible to enhance the convenience of the user.

Supplementary Note 4

The method of correcting the projection image described in one of Supplementary Note 2 and Supplementary Note 3 further including changing the at least one first control point to a second control point when a fourth gesture operation is detected based on an output value of the sensor, wherein the fourth gesture operation is an operation of moving at least one of the hands of the user having the first shape into the range, and then moving the at least one of the hands of the user having the first shape outside the range within a predetermined period.

According to the above, it is possible to set the control point as not to be the movement target using a gesture operation different from the gesture operation of selecting the control point and the gesture operation of moving the control point. Therefore, it is possible to further prevent an occurrence of the erroneous operation that the control point unintended by the user moves to a position unintended by the user in the correction of the projection image.

Supplementary Note 5

The method of correcting the projection image described in Supplementary Note 4, wherein the first control point is a control point in a first display mode, and the second control point is a control point in a second display mode different from the first display mode.

According to the above, it is possible for the user to easily figure out which control point is the control point to be moved by the gesture operation. Therefore, it is possible to prevent an occurrence of the erroneous operation that the control point unintended by the user moves to a position unintended by the user in the correction of the projection image, and at the same time, it is possible to enhance the convenience of the user.

Supplementary Note 6

The method of correcting the projection image described in any one Supplementary Note 1 through Supplementary Note 5, wherein the first shape is a state of erecting X fingers, the second shape is a state of erecting Y fingers, the X is an integer that is equal to or more than 0 and that is equal to or less than 5, the Y is an integer that is equal to or more than 0 and that is equal to or less than 5, and the X is different from the Y.

According to the above, by making the number of fingers of the hand different, it is possible for the user to appropriately distinguish the gesture operation of selecting the control point and the gesture operation of moving the control point from each other. Therefore, it is possible to prevent an occurrence of the erroneous operation that the control point unintended by the user moves to a position unintended by the user in the correction of the projection image, and at the same time, it is possible to enhance the convenience of the user.

Supplementary Note 7

A projector including at least one processor configured to execute projecting a first image including a plurality of control points configured to correct a projection image on a projection surface, identifying at least one first control point from the plurality of control points based on a position of at least one of hands of a user in the first image when a first gesture operation by at least one of the hands of the user is detected based on an output value of a sensor, and projecting a second image obtained by moving a position of the at least one first control point from a first position to a second position based on a position of at least one of the hands of the user in the first image on the projection surface when a second gesture operation by at least one of the hands of the user different from the first gesture operation is detected based on an output value of the sensor.

According to the above, there are exerted substantially the same advantages as those of the method of correcting the projection image according to Supplementary Note 1.

Supplementary Note 8

A projection system including a sensor, a control device configured to execute identifying at least one first control point from a plurality of control points configured to correct the projection image based on a position of at least one of hands of a user in a first image which is projected on a projection surface, and which includes the plurality of control points, when a first gesture operation by at least one of the hands of the user is detected based on an output value of a sensor, and detecting a second gesture operation by at least one of the hands of the user different from the first gesture operation based on an output value of the sensor, and a projector configured to execute projecting the first image on the projection surface, and projecting a second image obtained by moving a position of the at least one first control point from a first position to a second position based on a position of at least one of the hands of the user in the first image on the projection surface when the second gesture operation is detected by the control device.

According to the above, there are exerted substantially the same advantages as those of the method of correcting the projection image according to Supplementary Note 1.

Supplementary Note 9

A non-transitory computer-readable storage medium storing a program configured to make at least one processor execute processing including projecting a first image including a plurality of control points configured to correct a projection image from a projector on a projection surface, identifying at least one first control point from the plurality of control points based on a position of at least one of hands of a user in the first image when a first gesture operation by at least one of the hands of the user is detected based on an output value of a sensor, and projecting a second image obtained by moving a position of the at least one first control point from a first position to a second position based on a position of at least one of the hands of the user in the first image from the projector on the projection surface when a second gesture operation by at least one of the hands of the user different from the first gesture operation is detected based on an output value of the sensor.

According to the above, there are exerted substantially the same advantages as those of the method of correcting the projection image according to Supplementary Note 1.

What is claimed is:

1. A method of correcting a projection image, the method comprising:

projecting, by a projector, a first image including a plurality of control points configured to correct the projection image on a projection surface;

identifying at least one first control point from the plurality of control points based on a position of at least one of hands of a user in the first image when a first gesture operation by at least one of the hands of the user is detected based on an output value of a sensor; and projecting, by the projector, a second image obtained by moving a position of the at least one first control point from a first position to a second position based on a position of at least one of the hands of the user in the first image on the projection surface when a second gesture operation by at least one of the hands of the user different from the first gesture operation is detected based on an output value of the sensor, wherein the first gesture operation is an operation of moving at least one of the hands of the user having a first shape into a range in which a distance from the projection surface is equal to or shorter than a threshold value, and the second gesture operation is an operation of moving at least one of the hands of the user having a second shape different from the first shape in the range as much as a distance equal to or longer than a first distance.

2. The method of correcting the projection image according to claim 1, wherein the identifying at least one first control point includes when a third gesture operation is detected based on an output value of the sensor, identifying a setting area set by the third gesture operation in the first image, and identifying a control point included in the setting area out of the plurality of control points as the at least one first control point, and the third gesture operation is an operation of moving at least one of the hands of the user having the first shape in the range as much as a distance equal to or longer than a second distance.

3. The method of correcting the projection image according to claim 1, further comprising:

changing the at least one first control point to a second control point when a fourth gesture operation is detected based on an output value of the sensor, wherein the fourth gesture operation is an operation of moving at least one of the hands of the user having the first shape into the range, and then moving the at least one of the hands of the user having the first shape outside the range within a predetermined period.

4. The method of correcting the projection image according to claim 3, wherein the first control point is a control point in a first display mode, and the second control point is a control point in a second display mode different from the first display mode.

5. The method of correcting the projection image according to claim 1, wherein the first shape is a state of erecting X fingers, the second shape is a state of erecting Y fingers, the X is an integer that is equal to or more than 0 and that is equal to or less than 5, the Y is an integer that is equal to or more than 0 and that is equal to or less than 5, and the X is different from the Y.

6. A projection system comprising:

a sensor;

a control device configured to execute identifying at least one first control point from a plurality of control points configured to correct a projection image based on a position of at least one of hands of a user in a first image which is projected on a projection surface, and which includes the plurality of control points, when a first gesture operation by at least one of the hands of the user is detected based on an output value of the sensor, and detecting a second gesture operation by at least one of the hands of the user different from the first gesture operation based on an output value of the sensor; and a projector configured to execute projecting the first image on the projection surface, and projecting a second image obtained by moving a position of the at least one first control point from a first position to a second position based on a position of at least one of the hands of the user in the first image on the projection surface when the second gesture operation is detected by the control device, wherein the first gesture operation is an operation of moving at least one of the hands of the user having a first shape into a range in which a distance from the projection surface is equal to or shorter than a threshold value, and the second gesture operation is an operation of moving at least one of the hands of the user having a second shape different from the first shape in the range as much as a distance equal to or longer than a first distance.

7. The projection system of claim 6, wherein the identifying at least one first control point includes when a third gesture operation is detected based on an output value of the sensor, identifying a setting area set by the third gesture operation in the first image, and identifying a control point included in the setting area out of the plurality of control points as the at least one first control point, and the third gesture operation is an operation of moving at least one of the hands of the user having the first shape in the range as much as a distance equal to or longer than a second distance.

8. The projection system of claim 6, wherein the control device is further configured to execute changing the at least one first control point to a second control point when a fourth gesture operation is detected based on an output value of the sensor, wherein the fourth gesture operation is an operation of moving at least one of the hands of the user having the first shape into the range, and then moving the at least one of the hands of the user having the first shape outside the range within a predetermined period.

9. The projection system of claim 8, wherein the first control point is a control point in a first display mode, and the second control point is a control point in a second display mode different from the first display mode.

10. The projection system of claim 6, wherein the first shape is a state of erecting X fingers, the second shape is a state of erecting Y fingers, the X is an integer that is equal to or more than 0 and that is equal to or less than 5, the Y is an integer that is equal to or more than 0 and that is equal to or less than 5, and the X is different from the Y.

11. A non-transitory computer-readable storage medium storing a program, the program being configured to make at least one processor execute processing comprising:

projecting a first image including a plurality of control points configured to correct a projection image from a projector on a projection surface;

identifying at least one first control point from the plurality of control points based on a position of at least one of hands of a user in the first image when a first gesture operation by at least one of the hands of the user is detected based on an output value of a sensor; and projecting a second image obtained by moving a position of the at least one first control point from a first position to a second position based on a position of at least one of the hands of the user in the first image from the projector on the projection surface when a second gesture operation by at least one of the hands of the user different from the first gesture operation is detected based on an output value of the sensor, wherein the first gesture operation is an operation of moving at least one of the hands of the user having a first shape into a range in which a distance from the projection surface is equal to or shorter than a threshold value, and the second gesture operation is an operation of moving at least one of the hands of the user having a second shape different from the first shape in the range as much as a distance equal to or longer than a first distance.

12. The non-transitory computer-readable storage medium of claim 11, wherein the identifying at least one first control point includes when a third gesture operation is detected based on an output value of the sensor, identifying a setting area set by the third gesture operation in the first image, and identifying a control point included in the setting area out of the plurality of control points as the at least one first control point, and the third gesture operation is an operation of moving at least one of the hands of the user having the first shape in the range as much as a distance equal to or longer than a second distance.

13. The non-transitory computer-readable storage medium of claim 11, that further causes a processing device to:

change the at least one first control point to a second control point when a fourth gesture operation is detected based on an output value of the sensor, wherein the fourth gesture operation is an operation of moving at least one of the hands of the user having the first shape into the range, and then moving the at least one of the hands of the user having the first shape outside the range within a predetermined period.

14. The non-transitory computer-readable storage medium of claim 13, wherein the first control point is a control point in a first display mode, and the second control point is a control point in a second display mode different from the first display mode.

15. The non-transitory computer-readable storage medium of claim 8, wherein the first shape is a state of erecting X fingers, the second shape is a state of erecting Y fingers, the X is an integer that is equal to or more than 0 and that is equal to or less than 5, the Y is an integer that is equal to or more than 0 and that is equal to or less than 5, and the X is different from the Y.

* * * * *